US008990874B2

(12) United States Patent
Huang

(10) Patent No.: US 8,990,874 B2
(45) **Date of Patent: *Mar. 24, 2015**

(54) APPARATUS AND METHOD FOR AUTOMATIC REALTIME CLOUD COMPUTING PROCESSING FOR LIVE MULTIMEDIA CONTENT

(76) Inventor: Jeffrey Huang, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,879

(22) Filed: Apr. 12, 2012

(65) Prior Publication Data

US 2012/0198335 A1 Aug. 2, 2012

Related U.S. Application Data

(63) Continuation-in-part of application No. 12/880,000, filed on Sep. 10, 2010.

(51) Int. Cl.

| | |
|---|---|
| ***H04N 7/173*** | (2011.01) |
| ***H04L 29/06*** | (2006.01) |
| ***G06F 17/30*** | (2006.01) |
| ***H04N 21/2343*** | (2011.01) |
| ***H04N 21/24*** | (2011.01) |

(52) U.S. Cl.

CPC ...... *H04L 65/4076* (2013.01); *G06F 17/30867* (2013.01); *H04N 21/234309* (2013.01); *H04N 21/2405* (2013.01); *H04L 65/605* (2013.01); *H04L 65/1026* (2013.01); *H04N 21/234336* (2013.01)

USPC ............................ 725/110; 725/115; 709/219

(58) Field of Classification Search

CPC H04N 21/218; H04N 21/2743; H04N 21/632

USPC ........... 725/109, 110, 11, 116, 133, 151–153, 725/115

See application file for complete search history.

(56) References Cited

U.S. PATENT DOCUMENTS

| | | | | |
|---|---|---|---|---|
| 2008/0133766 | A1* | 6/2008 | Luo | 709/231 |
| 2008/0134235 | A1* | 6/2008 | Kalaboukis | 725/32 |
| 2011/0126250 | A1* | 5/2011 | Turner | 725/109 |
| 2012/0002717 | A1* | 1/2012 | Ma et al. | 375/240.01 |
| 2012/0102154 | A1* | 4/2012 | Huang et al. | 709/219 |
| 2012/0179788 | A1* | 7/2012 | McGowan | 709/219 |

* cited by examiner

*Primary Examiner* — Benjamin R Bruckart
*Assistant Examiner* — Michael M Nguyen
(74) *Attorney, Agent, or Firm* — Invent Capture, LLC; Samuel S. Cho

(57) ABSTRACT

An apparatus and a method for automatic real-time cloud computing processing of live multimedia content are disclosed. In one embodiment of the invention, a portable electronic device can transmit live event multimedia data to a web/cloud computing storage service in real time, wherein the web/cloud computing storage service segmentizes incoming streams of the live event multimedia data into multiple media files during an ongoing transmission of the live event multimedia data. In one embodiment of the invention, the size of each segmented media file depends on a current network traffic condition and/or a bandwidth availability. By automatically segmentizing the streams of encoded multimedia data into individually-viewable segments for the web or cloud-computing storage service, a user can start viewing the currently-uploading multimedia data faster than a conventional single stream upload which requires a longer waiting time.

9 Claims, 12 Drawing Sheets

900

An apparatus performing an automatic real-time cloud computing processing of live multimedia content

400

500

An embodiment of the invention showing how an incoming multimedia signal is received, routed, and/or stored to a device operatively connected to the set-top box.

An embodiment of the invention showing how multimedia data initially auto-routed and stored in the web/cloud computing storage via the set-top box can be accessed by a user An embodiment of the invention showing how a user can control the set-top box via a web/cloud computing service to initiate. modify. or cancel encoding. routing. and/or storing of incoming multimedia signals to the set-top box

900

An apparatus performing an automatic real-time cloud computing processing of live multimedia content An apparatus performing an automatic real-time cloud computing processing of live multimedia content A method for automatic real-time cloud computing processing of live multimedia content An embodiment of the invention showing how a user can control the portable electronic device via a web/cloud computing service to initiate, modify, or cancel recording, encoding, routing, and/or storing of live events captured by the visual and/or aural sensors of the portable electronic device

APPARATUS AND METHOD FOR AUTOMATIC REALTIME CLOUD COMPUTING PROCESSING FOR LIVE MULTIMEDIA CONTENT

BACKGROUND OF THE INVENTION

The present invention generally relates to multimedia data recording, processing, storage, and access. More specifically, some embodiments of the invention relate to one or more apparatuses and methods for multimedia data reception, processing (e.g. capturing, encoding), routing, storage, and access using a set-top box connected to a multimedia signal source and a web user interface. Furthermore, some embodiments of the invention also relate to a web synchronization of an encoded multimedia stream from the set-top box, wherein the set-top box is capable of generating the encoded multimedia data stream from the multimedia signal source. In addition, some embodiments of the invention also relate to one or more apparatuses and methods for automatic real-time cloud computing processing of live multimedia content.

Multimedia data upload and access services, such as YouTube, have reached an iconic cultural status on the Internet today. Many people utilize a video footage portal service to share their favorite videos with others or to search existing footages for entertainment or educational purposes. Nevertheless, the current process of uploading or sharing information to a video footage portal service typically requires a manual human intervention to capture, encode, upload, and/or configure a multimedia file using a personal computer (PC) or another PC-like device such as an Internet-protocol-capable cellular phone. Typically, the manual human intervention also requires one or more multimedia uploading and/or editing software and a manual user interaction with the video footage portal service itself. Although highly tech-savvy people who exhibit an advanced level of computer utilizations dexterously use a video footage portal service for file upload and sharing, a large number of Internet users are uncomfortable tweaking with a variety of multimedia software tools or web uploading interfaces, and therefore exhibit reluctance to use video footage portal services comfortably for prevalent uploading or sharing of multimedia information. A consumer reluctance to become dexterous or "power users" of video footage portal services is especially pervasive for an older age group such as the baby boomers, who are typically computer literate enough to search YouTube, but do not feel very comfortable in becoming power users for such services.

Furthermore, many users, regardless of their age or computer literacy, find manual human interventions for uploading a video footage quite cumbersome and annoying. For example, if a user wants to upload a ten-minute video footage of a family gathering, it typically requires an uplink to a computer, which may use a software to convert the ten-minute video footage into a more convenient format (avi, MPEG, and etc.) for the uploading to YouTube. The user may also have to spend some time on an editing software to clip a particular portion of the ten-minute video footage prior to uploading. Then, for the actual uploading of the video footage, the user has to log into YouTube and follow uploading procedures, all of which require some degree of manual human intervention and supervision. Therefore, a large number of Internet users may find the conventional multimedia data encoding, conversion, and/or uploading processes too cumbersome to make video footage portal services as their intuitive choice for everyday personal multimedia data archiving or sharing.

Therefore, it may be highly advantageous to devise an apparatus and a method which largely automates multimedia data reception, processing (e.g. capturing, encoding), routing, storage, and access. Furthermore, it may be also advantageous to perform a seamless and automated multimedia data encoding, routing, and storage of a received multimedia signal (i.e. received by a cable line, a satellite dish, and/or an ATSC airwave antenna) to a particular web service (e.g. a video footage portal service), a device (e.g. an iPod), and/or a computing platform (e.g. a cloud computing platform) without constraining this automation to a provider-specific infrastructure, equipment, and/or service (e.g. infrastructure, equipment, and/or service specific and limited to a particular cable company, a satellite broadcast company, or an airwave broadcast company.).

In addition, it may also be advantageous to devise an apparatus and a method to retrieve an automatically-stored multimedia signal routed from a set-top box to a web service or a cloud-computing server to a user connected anywhere on a wide-area network or a local-area network without having a service provider-specific constraints, such as using a particular multimedia data recording plan supported by a provider-specific infrastructure and equipment.

Moreover, it may also be advantageous to devise an apparatus and a method for automatic real-time cloud computing processing of live multimedia content captured by a portable electronic device that receives a remotely-triggered recording request.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for performing an automatic real-time cloud computing processing of live multimedia content is disclosed. In this embodiment of the invention, this apparatus comprises: a portable electronic device capable of capturing a live event when a record instruction is remotely triggered by a user operating a web interface remotely networked to the portable electronic device, wherein the live event is then encoded as visual and aural information in a standard multimedia format using a microprocessor and an embedded codec in the portable electronic device, and wherein the encoded visual and aural information is transmitted to a cloud computing service unit in real time via a data network; the cloud computing service unit executing a multimedia data management and viewing program operating on a CPU and a memory unit in the cloud computing service unit, wherein the cloud computing service unit is configured to receive an incoming stream of the encoded visual and aural information from the portable electronic device via a data network, and wherein the multimedia data management and viewing program is configured to segmentize the incoming stream of the encoded visual and aural information into multiple media files of varying sizes for faster preview based on a current condition of network traffic during a transmission of data from the portable electronic device; the web user interface executed on the CPU and the memory unit of the cloud computing service unit or on an associated computer system operatively connected to the cloud computing service unit, wherein the web user interface is configured to log in a user to access the multiple media files and other stored files during and after the transmission of the data from the portable electronic device; and the data network comprising a wireless data network and/or a wired data network which are operatively connected to the portable electronic device and the cloud computing service unit, wherein the data network is configured to transmit the encoded visual and aural information from the portable electronic device to the cloud computing service unit.

In another embodiment of the invention, a method for automatic real-time cloud computing processing of a live multimedia content is disclosed. This method comprises the steps of: registering and authenticating a portable electronic device for real-time transmission of live event multimedia data from a sensor of the portable electronic device to a cloud computing service unit; triggering a live event to be recorded using a web interface operating on a computer or another computer-based interface which is remotely networked to the portable electronic device; capturing the live event using the portable electronic device, wherein the live event multimedia data are encoded in a digitized data format in a buffer memory unit of the portable electronic device; performing a real-time transmission of the live event multimedia data in the buffer memory unit to the cloud computing service unit over a data network, wherein the real-time transmission is initiated as soon as a first stream of the live event multimedia data is placed in the buffer memory unit; and dynamically segmentizing the live event multimedia data into individually-viewable multiple segments in the cloud computing service unit when at least some portions of the live event multimedia data are being received by the cloud computing service unit, wherein a size of each individually-viewable multiple segments is determined by a current data transmission speed over the data network, and wherein each individually-viewable segment is viewable by a user logged into the cloud computing service unit even before the real-time transmission of the live event multimedia data is entirely completed.

DETAILED DESCRIPTION

Figure 1:
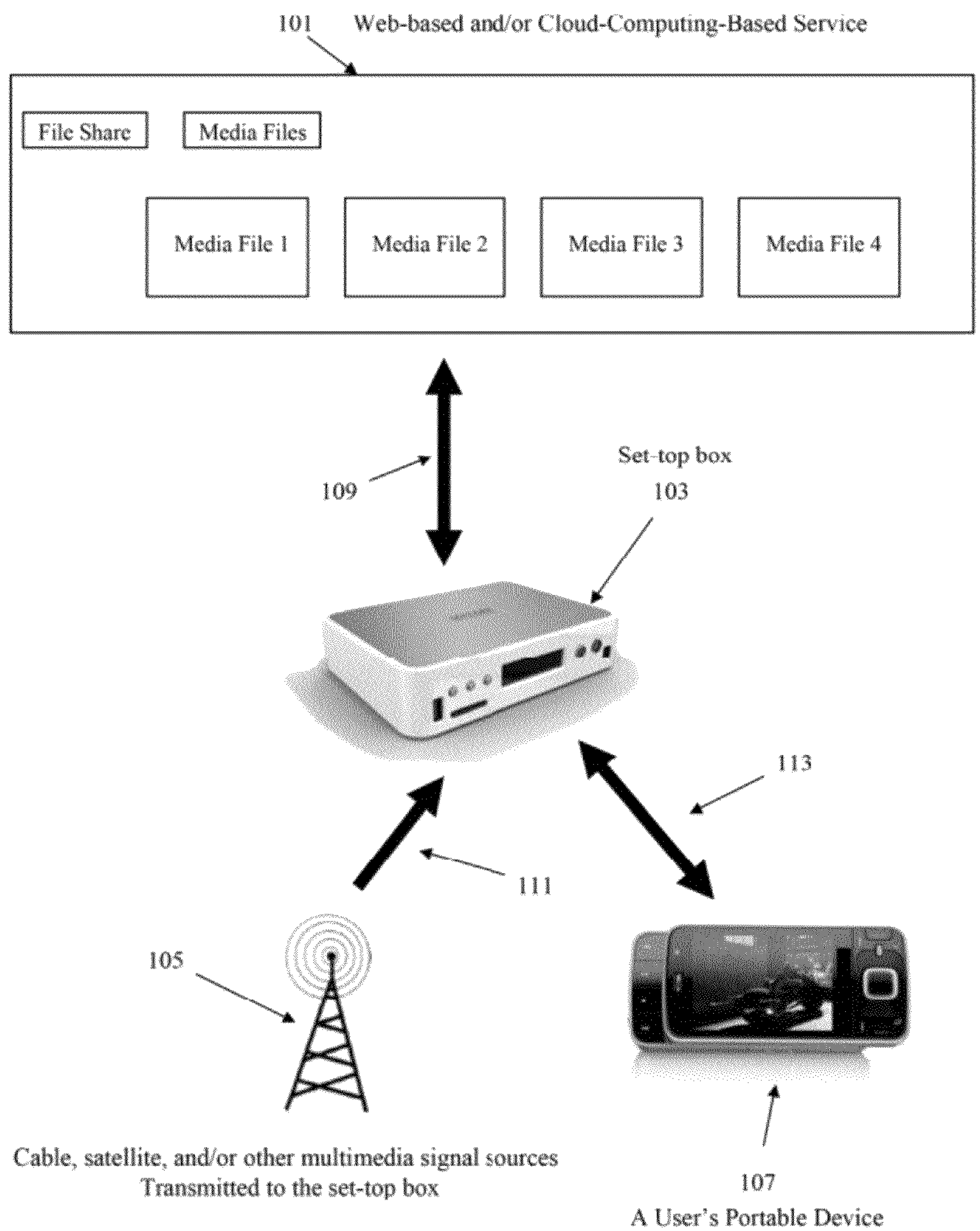
FIG. 1 shows an example of device interactions among a set-top box, a web-based and/or a cloud-computing-based service, a user's portable device, and a multimedia signal source in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble a method or an apparatus for multimedia data reception, processing (e.g. capturing, encoding), routing, storage, and access using a web synchronization of personal multimedia data. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

In general, embodiments of the invention relate to multimedia data reception, processing (e.g. encoding, capturing), routing, storage, and access. More specifically, the invention relates to an apparatus and a method for multimedia data reception, capturing, encoding, routing, storage, and access using a set-top box connected to a multimedia signal source and a web user interface. Furthermore, the invention also relates to a web synchronization of an encoded multimedia stream from the set-top box, wherein the set-top box is capable of generating the encoded multimedia data stream from the multimedia signal source. Moreover, the invention also relates to a method for an intelligent analysis of device compatibility, wherein a set-top box is capable of analyzing device compatibility even when a device driver for an external device (i.e. operatively connected to the set-top box) does not exist or is unavailable. Furthermore, the invention also relates to intelligent analysis of adaptive processing of multimedia data between a set-top box and an external device, wherein the apparatus is capable of adjusting a sampling rate of encoding of the multimedia data based on a remaining storage of the external device.

One objective of an embodiment of the present invention is to allow a user to automate processing and re-routing of a multimedia signal coming into a user's set-top box to a cloud-computing server or a web multimedia storage service, without requiring the user to be constrained within a multimedia signal service provider's network. For example, the present invention allows a user to process, re-route, store, and retrieve multimedia signals even when a user is not using a provider-specific network equipment, a provider-specific Intranet, and/or a provider-specific data recording device. Therefore, a major objective of an embodiment of the present invention is to enable a user's "generic" and/or an open-architecture set-top box to process, re-route, store, and retrieve a variety of multimedia signal sources (e.g. cable signals, satellite broadcasting signals, airwave signals, and etc.) flexibly without getting constrained by provider-specific routers, provider-specific set-top boxes, provider-specific data recording devices, or provider-specific Intranet.

Furthermore, another objective of an embodiment of the present invention is to allow a user to retrieve the stored multimedia signal originally re-routed from the user's generic set-top box to a cloud-computing server or a web service, wherein the user is able to retrieve the stored multimedia signal in the cloud-computing server or the web service on any network terminal (e.g. an Internet-connected computer) without being tethered to a particular multimedia signal service provider (e.g. a cable company, a satellite broadcasting company, and etc.), its data storage subscription plans, and/or its service-specific equipment. Therefore, a user who does not have two multimedia signal service provider-specific set-top boxes connected in a provider-specific local network can still transfer a stored multimedia signal from a first generic set-top box to a second generic set-top box or an Internet-connected computer by utilizing a web/cloud-computing synchronization of multimedia data In addition, another objective of an embodiment of the present invention is to enable the multimedia signal reception, processing, routing, storage, and retrieval to be independent of provider-specific equipment, provider-specific subscription plans, and provider-specific network. For example, an embodiment of the present invention enables processing (e.g. capturing, encoding, and etc.) and routing of multimedia signals to a web/cloud computing platform after raw multimedia signals are already decoded and/or decrypted by provider-specific equipment. Therefore, by reducing or removing the constraints of a broadcasting service provider-specific (a cable company, a satellite broadcasting company, and etc.) infrastructure and signal encryption/decryption methods, a user can benefit from a service-provider-independent flexibility of re-routing, processing (e.g. encoding to a different multimedia format), storing, and retrieving multimedia signals to and from a web/cloud-computing platform untethered from a broadcasting service provider.

Yet another objective of an embodiment of the present invention is to provide a unique method of uploading and viewing multimedia contents to a web or cloud computing-based infrastructure, wherein the unique method involves an automatic segmentization of a currently-uploading multimedia data stream depending on a current bandwidth in a network connection to the web or cloud computing-based infrastructure to enable quick viewing of some portions of the multimedia data stream even before the entire multimedia data is transmitted. The size of a segment can be adjusted by a set-top box transmitting the multimedia data stream depending on a current network bandwidth availability or a current processor, memory, I/O port, and/or other related workload of the set-top box. Furthermore, this unique method also involves a novel and automated "stitching" of individually-viewable segmentized data streams upon completion of the upload in the web or cloud computing-based infrastructure.

Yet another objective of an embodiment of the present invention is to devise an apparatus and a method for an automatic real-time cloud computing processing of live multimedia content captured by a portable electronic device that receives a remotely-triggered recording request.

FIG. 1 shows an example of device interactions among a set-top box (103), a web-based and/or a cloud-computing-based storage and service (101), a user's portable device (107), and a multimedia signal source (105) in accordance with an embodiment of the invention. In a preferred embodiment of the invention, the web-based and/or the cloud-computing based storage and service (101) is provided by a multimedia footage portal service such as YouTube. Furthermore, in the preferred embodiment of the invention, the set-top box (103) is capable of directly or indirectly processing the multimedia signal source (105), after which the set-top box (103) can encode a stream of multimedia data using a multimedia encoding format such as H.264, WMV, MPEG, and DivX compatible to a destination device (e.g. 107) and/or the web-based and/or the cloud-computing-based storage and service (101). In a preferred embodiment of the invention, a broadcasting service provider-specific signal receiver operatively connected to the set-top box (103) may pre-process, decode, decompress, and/or decrypt an incoming stream of multimedia signals which are specific to a particular broadcasting service provider (e.g. Comcast Cable, DirecTV, and etc.) before transmitting the pre-processed, decoded, decompress, and/or decrypted multimedia signals to the set-top box (103) for further signal processing. In the preferred embodiment of the invention, the set-top box (103) becomes a "portal" set-top box receiving pre-processed, decoded, decompress, and/or decrypted signals from one or more broadcasting service provider-specific signal receivers which process raw incoming signals first. Therefore, the "portal" set-top box (e.g. set-top box (103)) can serve as a gateway to a broadcasting service provider-independent processing, routing, storage, and retrieval of multimedia data originally sent from the multimedia signal sources (105), without security, viewing license, or subscription-related issues for multimedia signals processed by the present invention. The assumption in this portal set-top box embodiment is that a user will have to subscribe and pay for a particular broadcasting service plan if necessary (e.g. Comcast Cable, DirecTV, and etc.) to receive a license to pre-process, decode, decompress, and/or decrypt raw and often-encrypted multimedia signals with a broadcasting service provider-specific device such as a provider-specific signal receiver. Therefore, the subsequent personal re-routing, storage, and retrieval of multimedia data enabled by the present invention is generally presumed to be a legitimate use of the multimedia signal sources (105).

In one embodiment of the invention, the incoming stream of multimedia signals from one or more multimedia signal sources (105) is compressed and/or encrypted for bandwidth utilization and/or data content security. Furthermore, in one embodiment of the invention, the incoming stream of multimedia signals, in its raw form prior to pre-processing, decoding, decompressing, and/or decrypting, may also contain error correction mechanisms and signal resilience overheads. In one embodiment of the invention, such pre-processing, decoding, decompressing, and/or decrypting tasks for the incoming stream of multimedia signals can be performed by a service provider-specific signal receiver operatively connected to the set-top box (103). In another embodiment of the invention, the set-top box (103) may incorporate some or all of such pre-processing, decoding, decompressing, and/or decrypting tasks for the incoming stream of multimedia signals originally sent from the multimedia signal sources (105).

Continuing with FIG. 1, factors which influence the quality of images and video such as encoding rates can be determined or adjusted according to physical capabilities (e.g. resource and/or bandwidth availabilities of networks) (e.g. 109, 113), services (e.g. 101), and devices (e.g. 107) or user-defined preferences (e.g. "space savings mode", "maximum video quality" mode, and etc.). The multimedia signal source (105) is typically from a cable TV service, a satellite TV service, or an ATSC airwave broadcast. Furthermore, the user's portable device (107) is typically a cellular phone, a multimedia player such as an iPod, a portable video game player, or a data storage such as a USB Flash memory card. Moreover the operative connections (109, 111, 113) among multiple devices and services (101, 103, 105, 107) may be wired (e.g. USB, wired LAN, wired WAN) and/or wireless (e.g. Wi-LAN, WiMax, Bluetooth, Cellular).

In a preferred embodiment of the invention, the set-top box (103) is also capable of dividing (i.e. "segmentizing) a currently-uploading multimedia data stream to a multiple number of variable-length, segmentized, and viewable files in the web-based and/or cloud-computing-based service (101) while the transmission of the currently-uploading multimedia data is still ongoing (e.g. segmentizing the currently-uploading multimedia data to four segments, Media File 1~Media File 4). A current available bandwidth to the web-based and/or cloud-computing-based service (101) and a current processor, memory, I/O port, and/or other related workload of the set-top box (103) can be taken as determining variables for the length of a particular segment of an uploading file (i.e. Media File 1~Media File 4 in FIG. 1 may be part of a single multimedia data stream with different segment lengths). For example, if the current available bandwidth to the web-based and/or cloud-computing-based service (101) is getting lower, or if the workload of the set-top box (103) related to tasks other than uploading the multimedia data stream is getting higher, then a current segment of the uploading file may be a smaller segment than a previously-uploaded segment of the same multimedia data stream. Likewise, if the current available bandwidth to the web-based and/or cloud-computing-based service (101) is getting higher, or if the workload of the set-top box (103) related to tasks other than uploading the multimedia data stream is getting lower, then a current segment of the uploading file may be a larger segment than a previously-uploaded segment of the same multimedia data stream.

Furthermore, in the preferred embodiment of the invention, one or more segments of the currently-uploading multimedia data stream are viewable by a user logging onto the web-based and/or cloud-computing-based service (101), even when remaining segments of the multimedia data stream continue to be uploaded to the web-based and/or cloud-computing-based service (101). The dynamic segmentization of the currently-uploading multimedia data to the web-based and/or cloud-computing-based service (101) reduces wait-time for the user to start viewing the currently-uploading multimedia data (e.g. the user may start watching Media File 1 from the web-based and/or cloud-computing-based service (101), as remaining segments (i.e. Media Files 2~4) are getting uploaded). Moreover, when the currently-uploading multimedia data is completely transmitted to the web-based and/or cloud-computing-based service (101), the set-top box (103) or the web-based and/or cloud-computing-based service can be configured to "stitch" all segments to a single-viewable file, if the stitching of segments is the user's preferred option (e.g. stitching all segments (i.e. Media File 1~Media File 4) together if they are part of a single uploaded file).

Segmentizing a currently-uploading file with variable-length segments based on dynamically-changing bandwidth and workload conditions, reducing a user wait-time by making uploaded segments available for immediate viewing, and stitching of the segments after all segments are completely transmitted are clearly novel features of some embodiments of the invention. Compared to a conventional single-file upload method to a web or cloud-computing service, the automatic segmentization of the currently-uploading multimedia data gives faster user access to the currently-uploading multimedia data before the multimedia data is completely transmitted to the web or cloud-computing service. These features are especially unique when a file transfer protocol (FTP) or another connection interruption-resistant protocol is utilized for transmission of multimedia data from the set-top box (103) to the web-based and/or cloud-computing-based service (101).

Furthermore, in the preferred embodiment of the invention, the set-top box (103) is also capable of routing the stream of encoded multimedia data to a particular device (e.g. 107) or a service platform (e.g. 101) which may have its own network-attached storage. One important aspect of the present invention is that the set-top box (103) can serve as a bridge between a web-based and/or the cloud computing-based storage and service (101) and a user's portable device (107). The present invention enables a synchronization of a multimedia signal source (105) (i.e. received by the set-top box (103)) with a user's portable device (107) and/or a web-based/cloud-computing-based storage and service (101). The set-top box (103) plays a key bridging role in automating multimedia signal reception (e.g. for cable, satellite, or airwave TV signal), encoding the multimedia signal to a stream of multimedia data, and routing the stream of multimedia data to a desired device or a service platform without a manual human intervention. Furthermore, the present invention enables direct and automatic uploading of multimedia data from the user's portable device (107) to the web-based and/or cloud-computing-based storage and service (101) by using the set-top box without any need for a PC. Moreover, the set-top box (103) may also be capable of charging the user's portable device (107).

In a preferred embodiment of the invention, the set-top box (103) is a standalone device as illustrated in FIG. 1. In an alternate embodiment of the invention, the set-top box (103) may be integrated into another device, such as a display panel (e.g. a computer monitor, a television), a digital video recorder, or a portable electronic device.

Figure 2:
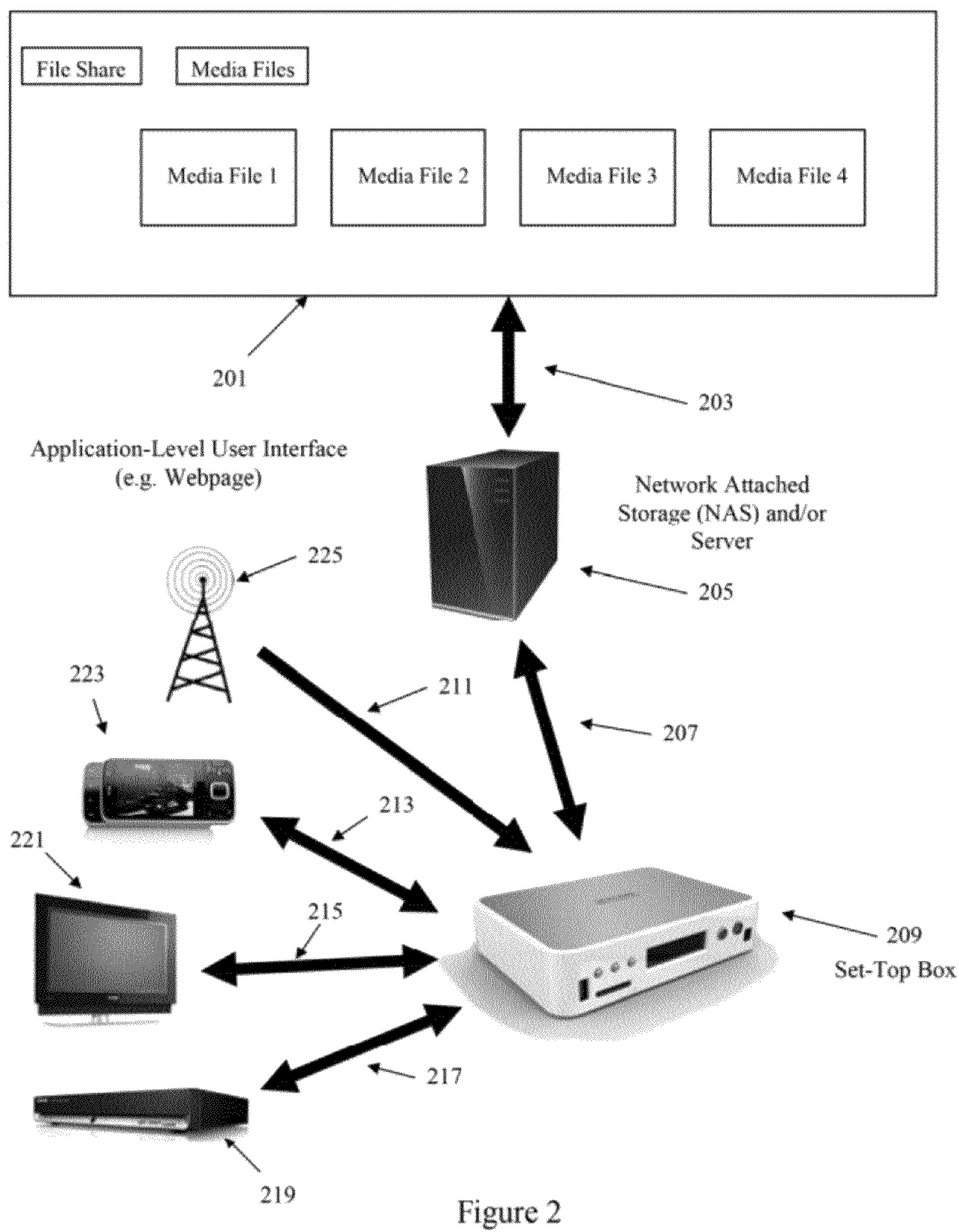
FIG. 2 shows another example of device interactions among a set-top box, a web-based and/or a cloud-computing-based service, a variety of user's devices, and a multimedia signal source in accordance with an embodiment of the invention.

FIG. 2 shows another example of device interactions among a set-top box (209), a web-based and/or a cloud-computing-based service (201), an NAS (205), a variety of user's devices (219, 221, 223), and a multimedia signal source (225) in accordance with an embodiment of the invention. In one embodiment of the invention, the web-based and/or the cloud-computing based storage and service (201) is provided by a multimedia footage portal service which uses an NAS (205) to store and access multimedia data. Furthermore, in the preferred embodiment of the invention, the set-top box (209) is capable of receiving the multimedia signal source (225), after which the set-top box (209) can encode a stream of multimedia data using a multimedia encoding format such as H.264, WMV, MPEG, and DivX compatible to a destination device (e.g. 219, 221, 223) and/or the web-based and/or the cloud-computing-based storage and service (201, 205). Factors which influence the quality of images and video such as encoding rates can be determined or adjusted according to physical capabilities (e.g. resource and/or bandwidth availabilities of networks) (e.g. 203, 207, 211, 213, 215, 217), services (e.g. 201), and devices (e.g. 219, 221, 223) or user-defined preferences (e.g. "space savings mode", "maximum video quality" mode, and etc.).

Continuing with FIG. 2, the multimedia signal source (225) is typically from a cable TV service, a satellite TV service, or an ATSC airwave broadcast. In the preferred embodiment of the invention, the set-top box (209) is capable of directly or indirectly processing the multimedia signal source (225), after which the set-top box (209) can encode a stream of multimedia data using a multimedia encoding format such as H.264, WMV, MPEG, and DivX compatible to a destination device (e.g. 223) and/or the web-based and/or the cloud-computing-based storage and service (205, 203, 201). In a preferred embodiment of the invention, a broadcasting service provider-specific signal receiver operatively connected to the set-top box (209) may pre-process, decode, decompress, and/or decrypt an incoming stream of multimedia signals which are specific to a particular broadcasting service provider (e.g. Comcast Cable, DirecTV, and etc.) before transmitting the pre-processed, decoded, decompressed, and/or decrypted multimedia signals to the set-top box (209) for further signal processing. In the preferred embodiment of the invention, the set-top box (209) becomes a "portal" set-top box receiving pre-processed, decoded, decompress, and/or decrypted signals from one or more broadcasting service provider-specific signal receivers which process raw incoming signals first. Therefore, the "portal" set-top box (e.g. set-top box (209)) can serve as a gateway to a broadcasting service provider-independent processing, routing, storage, and retrieval of multimedia data originally sent from the multimedia signal sources (209), without security, viewing license, or subscription-related issues for multimedia signals processed by the present invention. The assumption in this portal set-top box embodiment is that a user will have to subscribe and pay for a particular broadcasting service plan if necessary (e.g. Comcast Cable, DirecTV, and etc.) to receive a license to pre-process, decode, decompress, and/or decrypt raw and often-encrypted multimedia signals with a broadcasting service provider-specific device such as a provider-specific signal receiver. Therefore, the subsequent personal re-routing, storage, and retrieval of multimedia data enabled by the present invention is generally presumed to be a legitimate use of the multimedia signal sources (225).

In one embodiment of the invention, the incoming stream of multimedia signals from one or more multimedia signal sources (225) is compressed and/or encrypted for bandwidth utilization and/or data content security. Furthermore, in one embodiment of the invention, the incoming stream of multimedia signals, in its raw form prior to pre-processing, decoding, decompressing, and/or decrypting, may also contain error correction mechanisms and signal resilience overheads. In one embodiment of the invention, such pre-processing, decoding, decompressing, and/or decrypting tasks for the incoming stream of multimedia signals can be performed by a service provider-specific signal receiver operatively connected to the set-top box (209). In another embodiment of the invention, the set-top box (209) may incorporate some or all of such pre-processing, decoding, decompressing, and/or decrypting tasks for the incoming stream of multimedia signals originally sent from the multimedia signal sources (225).

Furthermore, the user's devices (219, 221, 223) in this example are a digital video recorder (DVR) (219), a display panel (221), and a cellular phone (223), respectively. Moreover the operative connections (203, 207, 211, 213, 215, 217) among multiple devices and services (201, 205, 209, 219, 221, 223, 225) may be wired (e.g. USB, wired LAN, wired WAN) and/or wireless (e.g. Wi-LAN, WiMax, Bluetooth, Cellular). In one embodiment of the invention, the set-top box (209) is also capable of routing the stream of encoded multimedia data to a particular device (e.g. 219, 221, 223) or a service platform (e.g. 201) which may have its own network-attached storage (205). Furthermore, as shown in a screen illustration (e.g. "File Share" and "Media Files") for the web-based and/or the cloud-computing-based service (201), a user can share his stored video or multimedia files with authorized peers. The web-based and/or a cloud-computing-based service (201) is generally capable of storing an encoded stream of multimedia data transmitted from the set-top box (209).

In a preferred embodiment of the invention, an NAS (205) operatively connected to the web-based and/or a cloud-computing-based service (201) is configured to store the encoded stream of multimedia data for a particular user identified by a user ID and a password. In the preferred embodiment of the invention, the user ID and the password can be used to retrieve user-specific and personal multimedia data stored in the NAS (205), which may have a front-end application-level user interface (e.g. a website screen illustration for 201) operatively connected to the NAS. In addition, the particular user may even be able to control at least some functions of the set-top box (209) from the web-based and/or the cloud-computing-based service (201). In the preferred embodiment of the invention, a synchronization of personal multimedia data is achieved by the set-top box (209), which acts as a synchronizing bridge among the web-based and/or the cloud-computing-based service (201), devices (219, 221, 223) connected to the set-top box (209), and a multimedia signal source typically from a cable TV provider, a satellite TV provider, or an airwave TV broadcaster.

Continuing with FIG. 2, in a preferred embodiment of the invention, the set-top box (209) is also capable of dividing (i.e. "segmentizing) a currently-uploading multimedia data stream to a multiple number of variable-length, segmentized, and viewable files in the web-based and/or cloud-computing-based service (201) while the transmission of the currently-uploading multimedia data is still ongoing (e.g. segmentizing the currently-uploading multimedia data to four segments, Media File 1~Media File 4). A current available bandwidth to the NAS (205) and the web-based and/or cloud-computing-based service (201) can be a determining factor in defining the size of a particular segment. Moreover, a current processor, memory, I/O port, and/or other related workload of the set-top box (209) can also be taken as determining variables for the length of a particular segment of an uploading file (i.e. Media Files 1~4 in FIG. 2 may be part of a single multimedia data stream with different segment lengths). For example, if the current available bandwidth to the NAS (205) and the web-based and/or cloud-computing-based service (201) is getting lower, or if the workload of the set-top box (209) related to tasks other than uploading the multimedia data stream is getting higher, then a current segment of the uploading file may be a smaller segment than a previously-uploaded segment of the same multimedia data stream. Likewise, if the current available bandwidth to the web-based and/or cloud-computing-based service (201) is getting higher, or if the workload of the set-top box (209) related to tasks other than uploading the multimedia data stream is getting lower, then a current segment of the uploading file may be a larger segment than a previously-uploaded segment of the same multimedia data stream.

Furthermore, in the preferred embodiment of the invention, one or more segments of the currently-uploading multimedia data stream are viewable by a user logging onto the web-based and/or cloud-computing-based service (201), even when remaining segments of the multimedia data stream continue to be uploaded to the NAS (205) and the web-based and/or cloud-computing-based service (201). The dynamic segmentization of the currently-uploading multimedia data to the web-based and/or cloud-computing-based service (201) reduces wait-time for the user to start viewing the currently-uploading multimedia data (e.g. the user may start watching Media File 1 from the web-based and/or cloud-computing-based service (201), as remaining segments (i.e. Media Files 2~4) are getting uploaded). Moreover, when the currently-uploading multimedia data is completely transmitted to the NAS (205) and the web-based and/or cloud-computing-based service (201), the set-top box (209) or the web-based and/or cloud-computing-based service (201) can be configured to "stitch" all segments to a single-viewable file, if the stitching of segments is the user's preferred option (e.g. stitching all segments (i.e. Media File 1~Media File 4) together if they are part of a single uploaded file).

Segmentizing a currently-uploading file with variable-length segments based on dynamically-changing bandwidth and workload conditions, reducing a user wait-time by making uploaded segments available for immediate viewing, and stitching of the segments after all segments are completely transmitted are clearly novel features of some embodiments of the invention. These features are especially unique when a file transfer protocol (FTP) or another connection interruption-resistant protocol is utilized for transmission of multimedia data from the set-top box (209) to the web-based and/or cloud-computing-based service (201).

In a preferred embodiment of the invention, the set-top box (209) is a standalone device as illustrated in FIG. 2. In an alternate embodiment of the invention, the set-top box (209) may be integrated into another device, such as a display panel (e.g. a computer monitor, a television), a digital video recorder, or a portable electronic device.

Figure 3:
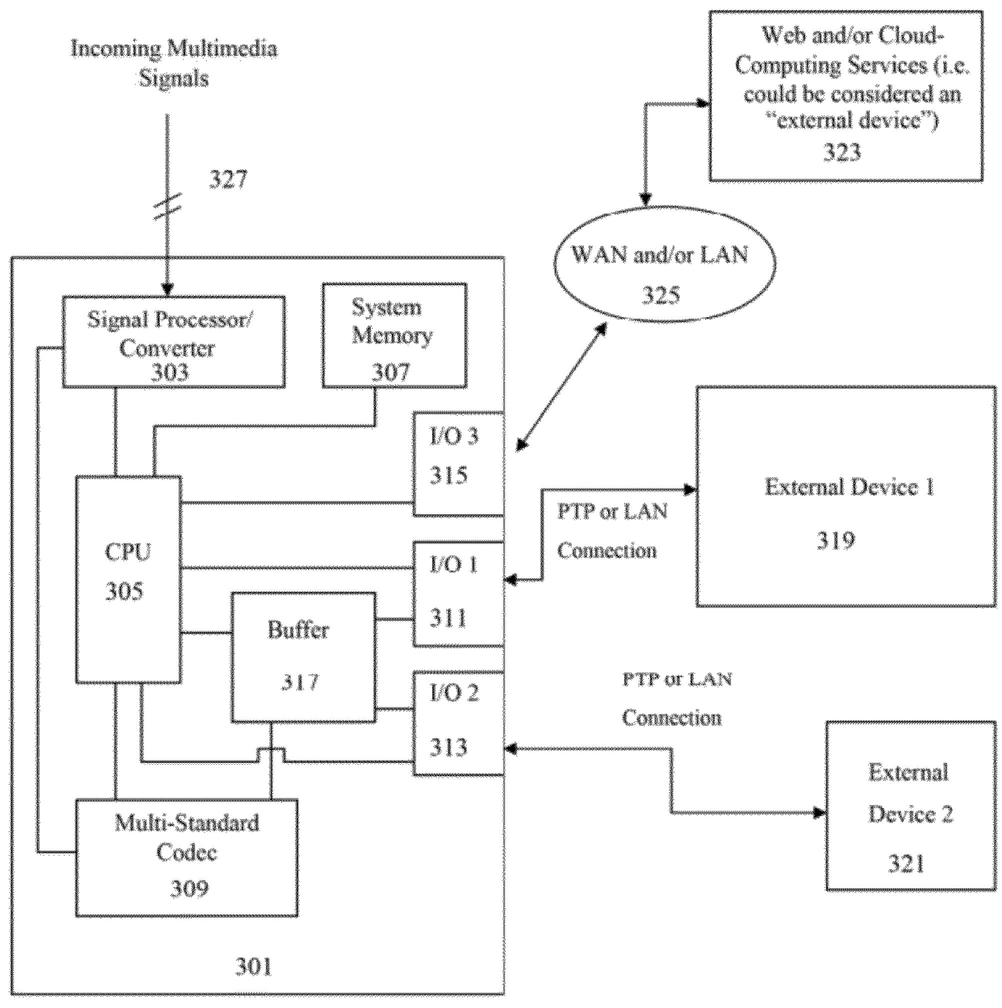
FIG. 3 shows an example of a block diagram for a set-top box, which may be operatively connected to a web-based and/or cloud-computing-based service and a plurality of external devices, in accordance with an embodiment of the invention.

FIG. 3 shows an example of a block diagram for a set-top box (301), which may be operatively connected to a web-based and/or cloud-computing-based service (323) and a plurality of external devices (319, 321), in accordance with an embodiment of the invention. In a preferred embodiment of the invention, the set-top box (301) comprises a signal processor/converter unit (303) (e.g. an analog-to-digital converter (ADC), a general signal processor, and etc.), which is configured to receive and convert an incoming stream of multimedia data signals (327) to a pre-encoded stream of digitized data, wherein the incoming stream of multimedia data signals is typically a raw broadcasting signal source or a pre-processed, decoded, decompressed, and/or decrypted stream of multimedia signals from a service-provider-specific signal receiver. In one embodiment of the invention, the incoming stream of multimedia data signals (327) is either directly or indirectly provided by a TV cable box, a satellite dish, a video camera, and/or a service provider-specific signal receiver.

In the preferred embodiment of the invention, the set-top box (301) further comprises a codec unit (309), which is configured to encode the pre-encoded stream of digitized data from the signal processor/converter (303) to an encoded stream of a standard multimedia encoding format. In one embodiment of the invention, the standard multimedia encoding format may be H.264, WMV, DivX, or MP3. In the preferred embodiment of the invention, the codec unit (309) is capable of handling a multiple number of multimedia encoding formats, which may include H.264, WMV, DivX, and MP3. Furthermore, the codec unit (309) is capable of generating the encoded stream of a standard multimedia encoding format for a particular native display resolution of an external device. For example, an encoded stream of a standard multimedia encoding format for an SVGA-screen external device may involve different signal transformations and processing compared to those needed for a QVGA-screen external device. The set-top box (301) in Figure is able to detect different native display resolutions of external devices automatically by using an intelligent analysis of device compatibility in accordance with the present invention, even when no device driver information of external devices are available to the set-top box (301).

Continuing with FIG. 3, the set-top box (301) further comprises a buffer memory unit (317) which is configured to store the encoded stream of the standard multimedia encoding format prior to transmission to an external device (e.g. 319, 321) or a web/cloud-computing services (323). Moreover, the set-top box (301) also typically includes a system memory unit (307) to store operating instructions and/or data for the set-top box (301), a central processing unit (CPU) (305), and one or more I/O units (e.g. 311, 313, 315). In one embodiment of the invention, the CPU (305) is operatively connected to the signal processor/converter unit (303), the codec unit (309), the system memory unit (307), the buffer unit (317), and the I/O units (311, 313, 315). The CPU (305) may also be capable of executing the intelligent analysis of device compatibility as well as adaptive processing of multimedia data based on a remaining storage space of an external device (e.g. 319, 321) or the web/cloud-computing services (323). Furthermore, in one embodiment of the invention, the web/cloud-computing services (323) is operatively connected to the set-top box (301) via a wide-area-network (WAN) and/or a local-area-network (LAN) (325). Even though an external device 1 (319) and an external device 2 (321) may typically be connected to the set-top box (301) by point-to-point (PTP) connections or local-area-network (LAN) connections, it is also possible to have the external devices (319, 321) connected to the set-top box (301) on a wide-area network.

The set-top box (301) as shown in FIG. 3 may also be controlled or adjusted by the web/cloud-computing services (323) or an external device (e.g. 319 or 321). An example of an adjustment of the set-top box (301) initiated by the web/cloud-computing services (323) is a consumer changing a video recording timing (e.g. from 2 pm to 5 pm) or a video channel (e.g. from CNN to ESPN) for multimedia data processed by the set-top box (301), even when the consumer is remotely located from the set-top box (301). In one embodiment of the invention, a web user interface associated with the web/cloud-computing services (323) is utilized to control or adjust at least some settings in the set-top box (301).

Figure 4:
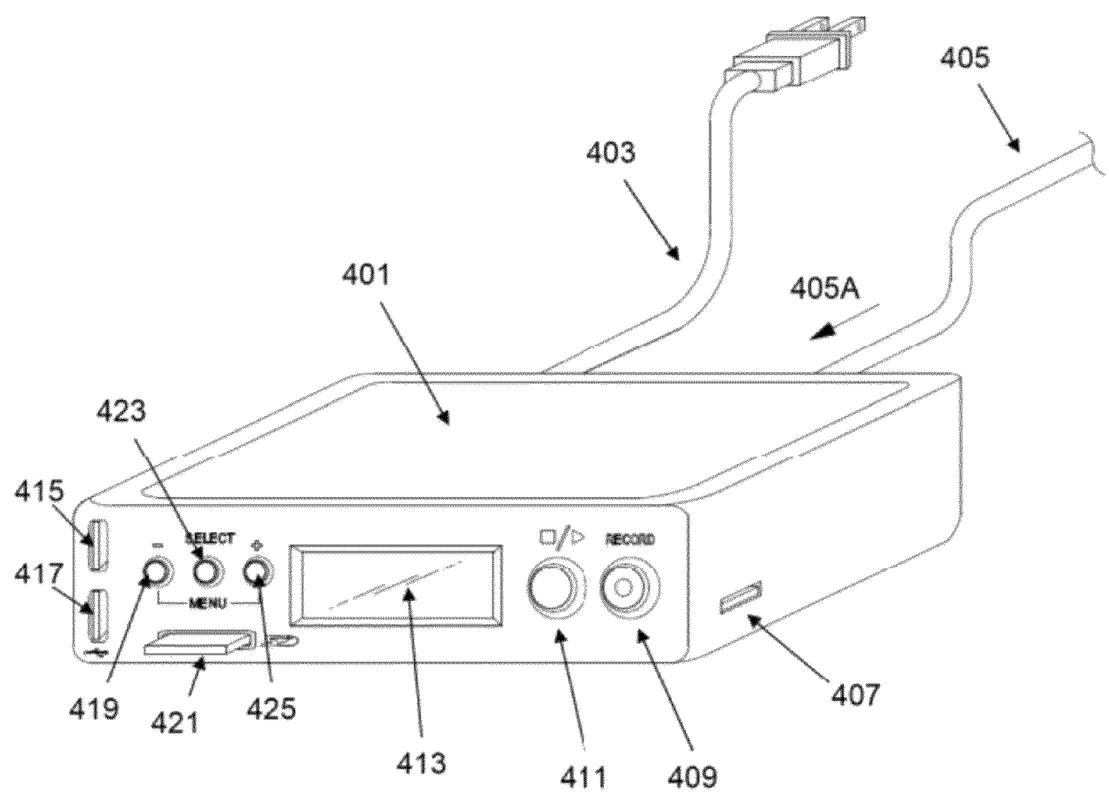
FIG. 4 shows a front view of an apparatus (e.g. a set-top box) capable of intelligent analysis of device compatibility and adaptive processing of multimedia data in accordance with an embodiment of the invention.

FIG. 4 shows a front view of an apparatus (400) capable of intelligent analysis of device compatibility and adaptive processing of multimedia data in accordance with an embodiment of the invention. In a preferred embodiment of the invention, the apparatus (400) is a set-top box (401) which is configured to receive an incoming stream of multimedia data signals (405A) from a data-transmitting medium (405). In case of the preferred embodiment of the invention, the incoming stream of multimedia data signals (405A) then goes through one or more signal transformations, signal processing, and/or digitized data encoding inside the set-top box (401) before an encoded stream of data is transmitted to an external device. Examples of an external device include an SD card storage (421) operatively connected to the apparatus (400), any USB-compliant device operatively connected to one or more USB ports (407, 415, 417), and a web/cloud-computing platform operatively connected to the set-top box (401). In one embodiment of the invention, the data-transmitting medium (405) is a copper-wire cable. In another embodiment of the invention, the data-transmitting medium (405) is a wireless transmitter sending signals to the apparatus (400). Yet in another embodiment of the invention, the data-transmitting medium (405) is a fiber optic line capable of transmitting optical signals to the apparatus (400).

In the preferred embodiment of the invention, the set-top box (401) also has a power cord (403) which receives an external electrical power to operate at least some internal electronic circuitry of the set-top box (401). The set-top box (401) also has a "Record" button (409) and a "Replay/Stop" button (411). In one instance of the preferred embodiment, pressing the "Record" button (409) initiates signal processing and conversion of an incoming stream of multimedia signals (405A) for transmission of a digitally-encoded stream of multimedia signals (405A) to an SD card (421) or a USB-compliant device operatively connected to a USB port (407, 415, 417) of the set-top box (401). Furthermore, in one instance of the preferred embodiment, pressing the "Replay/Stop" button (411) either triggers a "playback" command for encoded streams of the multimedia data or a "stop" command for transmission of the encoded streams of the multimedia data to an external device operatively connected to the set-top box (401). In one example of the "playback" command, the encoded streams of the multimedia data which have been already transmitted to an external device are "played back" on a display screen and/or a speaker attached or associated with the external device. In another example of the "playback" command, the encoded streams of the multimedia data which are buffered inside the set-top box and are not yet transmitted to the external device are "played back" on a display screen operatively connected to the set-top box (401). Examples of the display screen include, but are not limited to, an embedded display (413) of the set-top box, a display panel attached to another device other than the external device, and a display panel attached to the external device itself.

Continuing with FIG. 4, in the preferred embodiment of the invention, the embedded display (413) of the set-top box (401) is configured to display multimedia recording-related information such as date, time, encoding modes, TV/Video channel information, recording durations, recording reservation information, and etc. In one embodiment of the invention, a menu "select" button (423) is used to navigate menus and/or enter desired menu choices based on a user selection. In addition, menu assistance buttons (e.g. a "–" button (419), a "+" button (425)) can also be used for navigation of menus supplied by an embedded software of the set-top box (401). In one embodiment of the invention, a plurality of I/O ports (e.g. 407, 415, 417) are attached to the apparatus (400). In a preferred embodiment of the invention, the plurality of I/O ports are a USB-compliant port (e.g. 407, 415, 417) and an SD-card port configured to accept an SD card (421). Other possible types of I/O ports include, but are not limited to, a FireWire port, an HDMI port, a Micro SD port, and an optical data transmission port.

Continuing with FIG. 4, in one embodiment of the invention, the incoming stream of multimedia data signals (405A) is in analog domain which is first converted into a pre-encoded stream of digitized data by a signal processor/converter in the apparatus (400) (e.g. analog-to-digital converter (ADC), a general signal processor, and etc.). In another embodiment of the invention, the incoming stream of multimedia data signals (405A) is first pre-processed, decoded, decompressed, and/or decrypted by a service provider-specific signal receiver, which transmits this pre-processed data to the set-top box (401). Then, the pre-encoded stream of digitized data is further converted into an encoded stream of a standard multimedia encoding format, such as H.264, WMV, or DivX. In the preferred embodiment of the invention, the set-top box (401) may dynamically gather some information from an external device (e.g. an SD card (421), a USB-compliant device connected to a USB port (407, 415, 417), a web/cloud-computing platform operatively connected to the set-top box (401)) to adjust a sampling rate for encoding the pre-encoded stream into a standard multimedia encoding format before an encoded stream is transmitted to the external device. In the preferred embodiment of the invention, the information gathered from the external device may be a remaining storage space in the external device.

In one example of the preferred embodiment of the invention, the set-top box (401) has an "adaptive encoding" mode which continuously monitors the remaining storage space of the external device. In the "adaptive encoding" mode, the set-top box (401) may or may not know a desired end time of recording by a user. If the desired end time of recording is known at the time of recording command (e.g. pressing a "Record" button (409)), then the set-top box (401) can simply calculate the amount of storage space required in the external device to transfer all streams of relevant multimedia data. If the set-top box (401) determines that the external device has sufficient storage space even for a highest-quality sampling rate which is compatible with the external device, then the set-top box (401) may begin processing and transfer of the multimedia data to the external device at the highest-quality sampling rate. On the other hand, if the set-top box (401) determines that the external device has only sufficient storage for a lower-quality sampling rate for a standard multimedia encoding format, then the lower-quality sampling rate may be automatically used for encoding streams of the multimedia data for space-fitting transfer of the multimedia data to the external device.

In contrast, if the set-top box (401) does not know a desired end time of recording by the user because the user never specified the end time of multimedia data transfer to an external device, then the set-top box (401) can encode and transmit streams of multimedia data at a highest-possible-quality sampling rate until a threshold value for low available storage space is reached from the external device. Once the threshold value for low storage space is reached, the set-top box (401) can encode a subsequent stream of the multimedia data at a lower-quality sampling rate to cram in as many subsequent streams of multimedia data as possible until the low available storage space for the external device is completely consumed.

Figure 5:
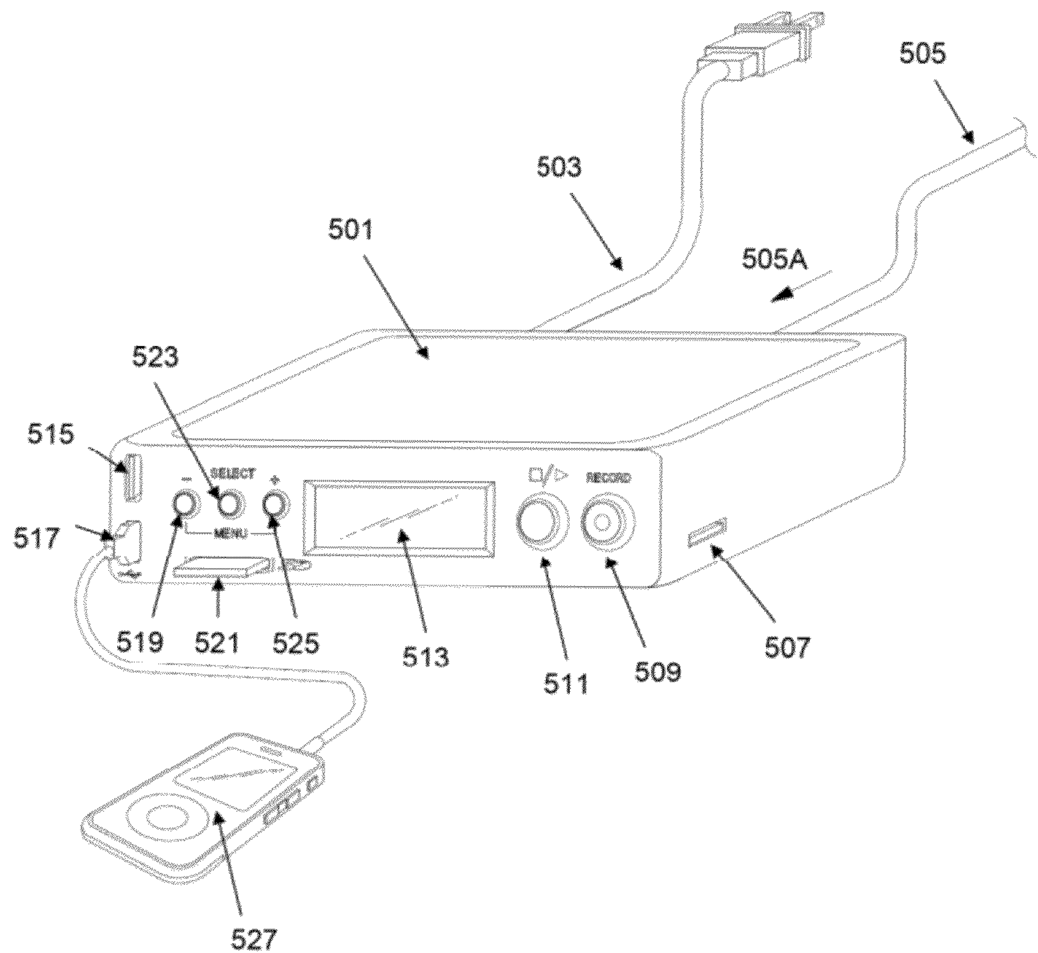
FIG. 5 shows a front view of a portable electronic device connected to an apparatus (e.g. a set-top box) capable of intelligent analysis of device compatibility and adaptive processing of multimedia data in accordance with an embodiment of the invention.

FIG. 5 shows a front view (500) of a portable electronic device (527) operatively connected to an apparatus (501) capable of intelligent analysis of device compatibility and adaptive processing of multimedia data in accordance with an embodiment of the invention. In one embodiment of the invention, the portable electronic device (527) is a portable multimedia player which can store and decode a stream of multimedia data in a standard multimedia format (e.g. H.264, WMV, DivX, MP3, and etc.) for a playback through its display panel and/or speaker. In a preferred embodiment of the invention, the portable electronic device (527) is operatively connected to the apparatus (e.g. set-top box (501)) via a USB cable and a first USB port (517).

The apparatus (e.g. set-top box (501)) in accordance with the present invention is capable of performing an intelligent analysis of device compatibility between the apparatus and an external device (e.g. the portable electronic device (527), a web/cloud-computing platform, and etc.) once the external device is operatively connected to the apparatus (e.g. set-top box (501)). In a preferred embodiment of the invention, the apparatus first detects an operative connection of an external device (e.g. 527) to an I/O port (e.g. the first USB port (517)) and/or a network data port such as an Ethernet port. In one example, the detection of operative connection is accomplished by checking voltage levels of one or more pins inside the I/O port. In another example, the detection of operative connection is accomplished by an initial wireless communication attempt between the I/O port and the apparatus. Then, the apparatus executes or attempts to execute an I/O-specific protocol for tests, mounting, and/or signature file access from the apparatus to the external device. In one example, the I/O-specific protocol for tests, mounting, and/or signature file access can be based on USB-standard specifications. In another example, the I/O-specific protocol for tests, mounting, and/or signature file access can be based on FireWire-standard specifications. Yet in another example, the I/O-specific protocol for tests, mounting, and/or signature file access can be based on Wi-LAN or IEEE 802.11 specifications.

Continuing with FIG. 5, once the external device (e.g. 527) and the apparatus (e.g. 501) goes through their I/O-specific test, mounting, and signature file access procedures, the apparatus (e.g. 501) uses a look-up table (LUT) containing external device-specific characteristics and conditional logic as an attempt to find a known file structure inside the external device (e.g. 527). The use of the LUT does not need to involve device driver information for the external device, because the apparatus will attempt to determine a particular model and type of the external device by making educated guesses (i.e. using conditional logic) via if-then and/or if-then-else statements in its attempt to find a known file structure inside the external device (e.g. 527). In one embodiment of the invention, the educated guesses using the conditional logic includes parsing serial numbers and/or model names of the external device even when the device driver for the external device is unavailable.

In a preferred embodiment of the invention, the LUT for external device-specific characteristics and conditional logic contained inside the apparatus (e.g. 501) includes information related to compatible data sampling rates (e.g. EP, LP, SP), multimedia codec types (e.g. H.264, WMV, DivX, MP3), and native display resolutions (e.g. QVGA, VGA, SVGA, XGA) for numerous kinds of external devices which may be potentially be connected to the apparatus. It is important to note that the external device-specific characteristics in the LUT are not provided by device drivers of external devices. In a typical embodiment of the invention, many external devices may not ever supply device drivers to the apparatus, because the external device manufacturers may not be aware of the apparatus or simply did not provide an explicit compatibility solution for the apparatus. A unique aspect of the present invention for intelligent analysis of device compatibility is that the LUT is typically pre-stored inside the apparatus and comprises of information which are publicly available through user manuals or specifications of common external devices. In a preferred embodiment of the invention, the LUT is periodically updated by a distributor and/or manufacturer of the apparatus (e.g. set-top box (501)).

Continuing with FIG. 5, in a preferred embodiment of the invention, if the known file structure is found inside the external device (e.g. 527), then the apparatus (e.g. 501) has identified essential external device-specific characteristics such as compatible data sampling rates (e.g. EP, LP, SP), compatible multimedia codec types (e.g. H.264, WMV, DivX, MP3), and desired native display resolutions (e.g. QVGA, VGA, SVGA, XGA) specifically for the external device (e.g. 527) from its LUT entries, based on its intelligent device compatibility analysis.

On the other hand, if the known file structure is not found inside the external device (e.g. 527), then the apparatus (e.g. 501) cannot identify the essential device-specific characteristics for the external device (e.g. 527). In a preferred embodiment of the invention, a failure to identify the known file structure inside the external device will prompt the apparatus (e.g. 501) to make an assumption that the external device (e.g. 527) has an I/O-compliant storage space (e.g. a USB-compliant storage space inside the portable electronic device (527), a hard disk storage space inside a web/cloud-computing platform). Then, the apparatus (e.g. 501) will attempt to create a file directory inside the external device (e.g. 527). If the file directory is successfully created, the apparatus (e.g. 501) can at least transfer some multimedia data to the external device (e.g. 527) based on a user command to the apparatus (e.g. 501) using one or more command buttons (e.g. 509, 511, 519, 523, 525). In contrast, if the file directory is not successfully created inside the external device (e.g. 527), then the apparatus (e.g. 501) can indicate that the apparatus and the external devices are fatally incompatible using an embedded display (513), an externally-connected display panel, and/or an attached speaker.

In one embodiment of the invention, an SD card (521) is designated as a backup storage for raw or transformed incoming stream of multimedia data signals, when and if no other external devices are operatively connected to the apparatus (e.g. 501). At least in one mode of operation, once another external device (e.g. 527) other than the SD card (521) is operatively connected to the apparatus (e.g. 501), the multimedia data stored in the SD card (521) can be transmitted to the other external device (e.g. 527). The backup storage (e.g. 521) can also simply be used as a buffer space prior to transmission of transformed, processed, and/or encoded multimedia data to another external device (e.g. 527).

Continuing with FIG. 5, in a preferred embodiment of the invention, the apparatus (e.g. 501) is a set-top box (501), which is configured to receive an incoming stream of multimedia data signals (505A) from a data-transmitting medium (505). In case of the preferred embodiment of the invention, the incoming stream of multimedia data signals (505A) then goes through one or more signal transformations, signal processing, and/or digitized data encoding inside the set-top box (501) before an encoded stream of data is transmitted to an external device. Examples of an external device include an SD card storage (521) operatively connected to the apparatus (e.g. set-top box (501)) and any USB-compliant device operatively connected to one or more USB ports (507, 515, 517). In one embodiment of the invention, the data-transmitting medium (505) is a copper-wire cable. In another embodiment of the invention, the data-transmitting medium (505) is a wireless transmitter sending signals to the apparatus (e.g. set-top box (51)). Yet in another embodiment of the invention, the data-transmitting medium (505) is a fiber optic line capable of transmitting optical signals to the apparatus (e.g. set-top box (501)).

In the preferred embodiment of the invention, the set-top box (501) also has a power cord (503) which receives an external electrical power to operate at least some internal electronic circuitry of the set-top box (501). The set-top box (501) also has a "Record" button (509) and a "Replay/Stop" button (511). In one instance of the preferred embodiment, pressing the "Record" button (509) initiates signal processing and conversion of an incoming stream of multimedia signals (505A) for transmission of a digitally-encoded stream of multimedia signals (505A) to an SD card (521) or a USB-compliant device operatively connected to a USB port (507, 515, 517) of the set-top box (501). Furthermore, in one instance of the preferred embodiment, pressing the "Replay/Stop" button (511) either triggers a "playback" command for encoded streams of the multimedia data or a "stop" command for transmission of the encoded streams of the multimedia data to an external device operatively connected to the set-top box (501). In one example of the "playback" command, the encoded streams of the multimedia data which have been already transmitted to an external device are "played back" on a display screen and/or a speaker attached or associated with the external device. In another example of the "playback" command, the encoded streams of the multimedia data which are buffered inside the set-top box and are not yet transmitted to the external device are "played back" on a display screen operatively connected to the set-top box (501). Examples of the display screen include, but are not limited to, an embedded display (513) of the set-top box, a display panel attached to another device other than the external device, and a display panel attached to the external device itself.

Continuing with FIG. 5, in the preferred embodiment of the invention, the embedded display (513) of the set-top box (501) is configured to display multimedia recording-related information such as date, time, encoding modes, TV/Video channel information, recording durations, recording reservation information, and etc. In one embodiment of the invention, a menu "select" button (523) is used to navigate menus and/or enter desired menu choices based on a user selection. In addition, menu assistance buttons (e.g. a "–" button (519), a "+" button (525)) can also be used for navigation of menus supplied by an embedded software of the set-top box (501). In one embodiment of the invention, a plurality of I/O ports (e.g. 507, 515, 517) are attached to the apparatus (e.g. set-top box (501)). In a preferred embodiment of the invention, the plurality of I/O ports are a USB-compliant port (e.g. 507, 515, 517) and an SD-card port configured to accept an SD card (521). Other possible types of I/O ports include, but are not limited to, a FireWire port, an HDMI port, a Micro SD port, and an optical data transmission port.

Continuing with FIG. 5, in one embodiment of the invention, the incoming stream of multimedia data signals (505A) is in analog domain which is first converted into a pre-encoded stream of digitized data by a signal processor/converter (e.g. analog-to-digital converter (ADC), a general signal processor, and etc.) in the apparatus (e.g. set-top box (501)). In another embodiment of the invention, the incoming stream of multimedia data signals (505A) is first pre-processed, decoded, decompressed, and/or decrypted by a service provider-specific signal receiver, which transmits this pre-processed data to the set-top box (501). Then, the pre-encoded stream of digitized data is further converted into an encoded stream of a standard multimedia encoding format, such as H.264, WMV, or DivX. In the preferred embodiment of the invention, the set-top box (501) may dynamically gather some information from an external device (e.g. an SD card (521) or a USB-compliant device (e.g. 527) connected to a USB port (507, 515, 517)) to adjust a sampling rate for encoding the pre-encoded stream into a standard multimedia encoding format before an encoded stream is transmitted to the external device. In the preferred embodiment of the invention, the information gathered from the external device may be a remaining storage space in the external device (e.g. 527).

In one example of the preferred embodiment of the invention, the set-top box (501) has an "adaptive encoding" mode which continuously monitors the remaining storage space of the external device (e.g. 527). In the "adaptive encoding" mode, the set-top box (501) may or may not know a desired end time of recording by a user. If the desired end time of recording is known at the time of recording command (e.g. pressing a "Record" button (509)), then the set-top box (501) can simply calculate the amount of storage space required in the external device to transfer all streams of relevant multimedia data. If the set-top box (501) determines that the external device has sufficient storage space even for a highest-quality sampling rate (e.g. an SP-mode) which is compatible with the external device, then the set-top box (501) may begin processing and transfer of the multimedia data to the external device at the highest-quality sampling rate. On the other hand, if the set-top box (501) determines that the external device has only sufficient storage for a lower-quality sampling rate (e.g. an LP-mode or an EP-mode) for a standard multimedia encoding format, then the lower-quality sampling rate may be automatically used for encoding streams of the multimedia data for space-fitting transfer of the multimedia data to the external device.

In contrast, if the set-top box (501) does not know a desired end time of recording by the user because the user never specified the end time of multimedia data transfer to an external device, then the set-top box (501) can encode and transmit streams of multimedia data at a highest-possible-quality sampling rate (e.g. an SP-mode) until a threshold value for low available storage space is reached from the external device. Once the threshold value for low storage space is reached, the set-top box (501) can encode a subsequent stream of the multimedia data at a lower-quality sampling rate (e.g. an LP-mode or an EP-mode) to "cram-in" as many subsequent streams of multimedia data as possible until the low available storage space for the external device is completely consumed or until the user commands the apparatus to stop transmission of the multimedia data.

Figure 6:
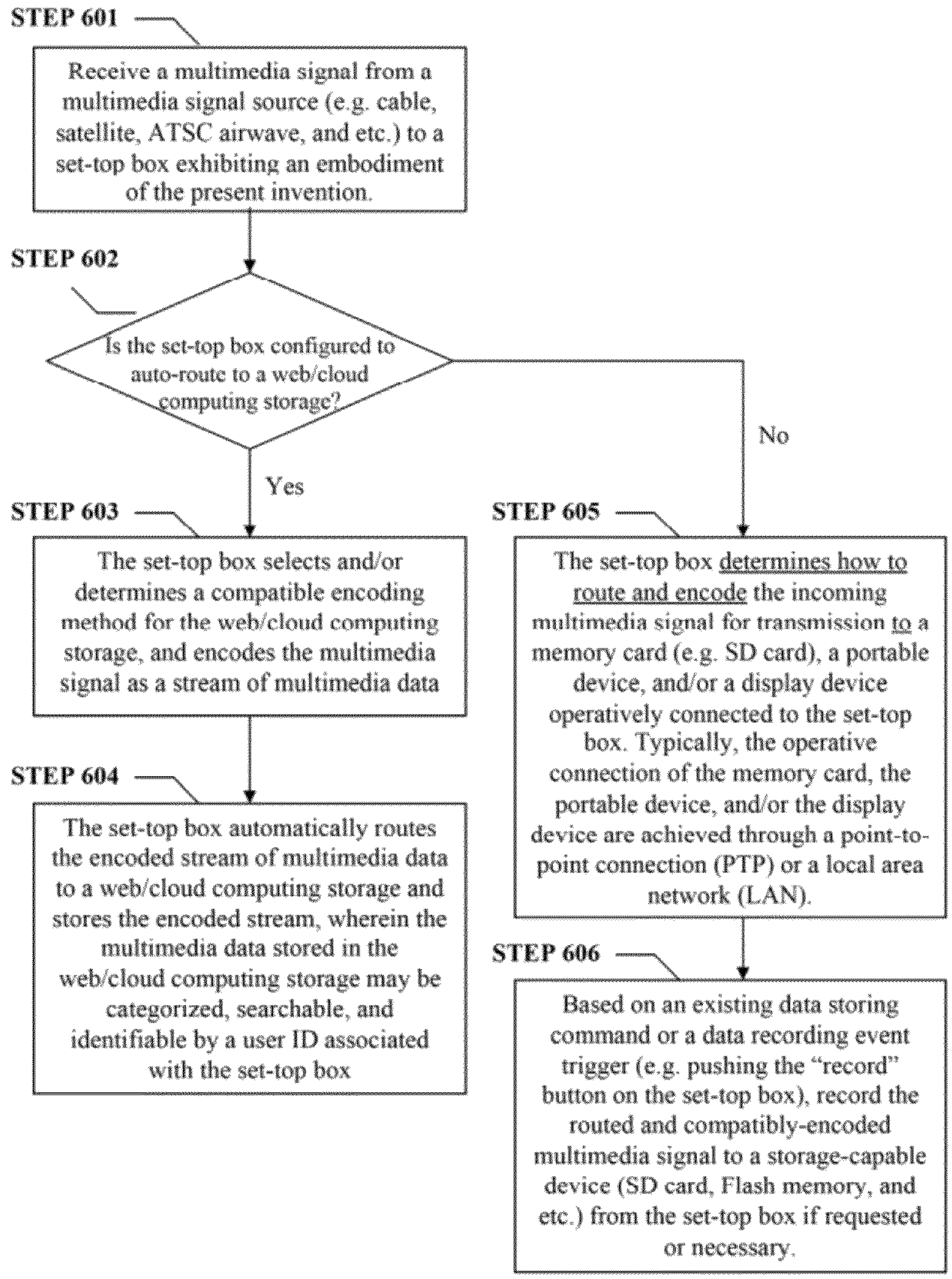
FIG. 6 shows a flowchart showing how an incoming multimedia signal is received, encoded, routed, and/or stored to a device operatively connected to a set-top box, in accordance with an embodiment of the invention.

FIG. 6 shows a flowchart showing how an incoming multimedia signal is received, encoded, routed, and/or stored to a device operatively connected to a set-top box, in accordance with an embodiment of the invention. In STEP 601, a set-top box exhibiting an embodiment of the present invention is configured to receive a multimedia signal from a multimedia signal source, which may be related to cable, satellite, ATSC airwave, or any other broadcasting and/or communication signal sources.

If the set-top box is set to auto-route to a web/cloud computing storage or service, as shown in STEP 602, then the set-top box selects and/or determines a compatible encoding method for the web/cloud computing storage, and encodes the multimedia signal as a stream of multimedia data, as shown in STEP 603. Then, the set-top box automatically routes the encoded stream of multimedia data to the web/ cloud computing storage and stores the encoded stream, wherein the multimedia data stored in the web/cloud computing storage may be categorized, searchable, and identifiable by a user ID associated with the set-top box, as shown in STEP 604.

On the other hand, if the set-top box is not configured to auto-route to the web/cloud computing storage, then the set-top box determines how to route and encode the incoming multimedia signal to a destination device such as a memory card (e.g. SD card), a portable device, and/or a display device operatively connected to the set-top box, as shown in STEP 605. Typically, the operative connection of the memory card, the portable device, and/or the display device is achieved through a point-to-point connection (PTP) or a local area network. Once the set-top box determines how to route and encode the incoming multimedia signal to the destination device, then based on an existing data storing command or a data recording event trigger (e.g. pushing the "record" button on the set-top box), record the routed and compatibly-encoded multimedia signal to a storage-capable device (SD card, Flash memory, and etc.) from the set-top box if requested or necessary, as shown in STEP 606.

Figure 7:
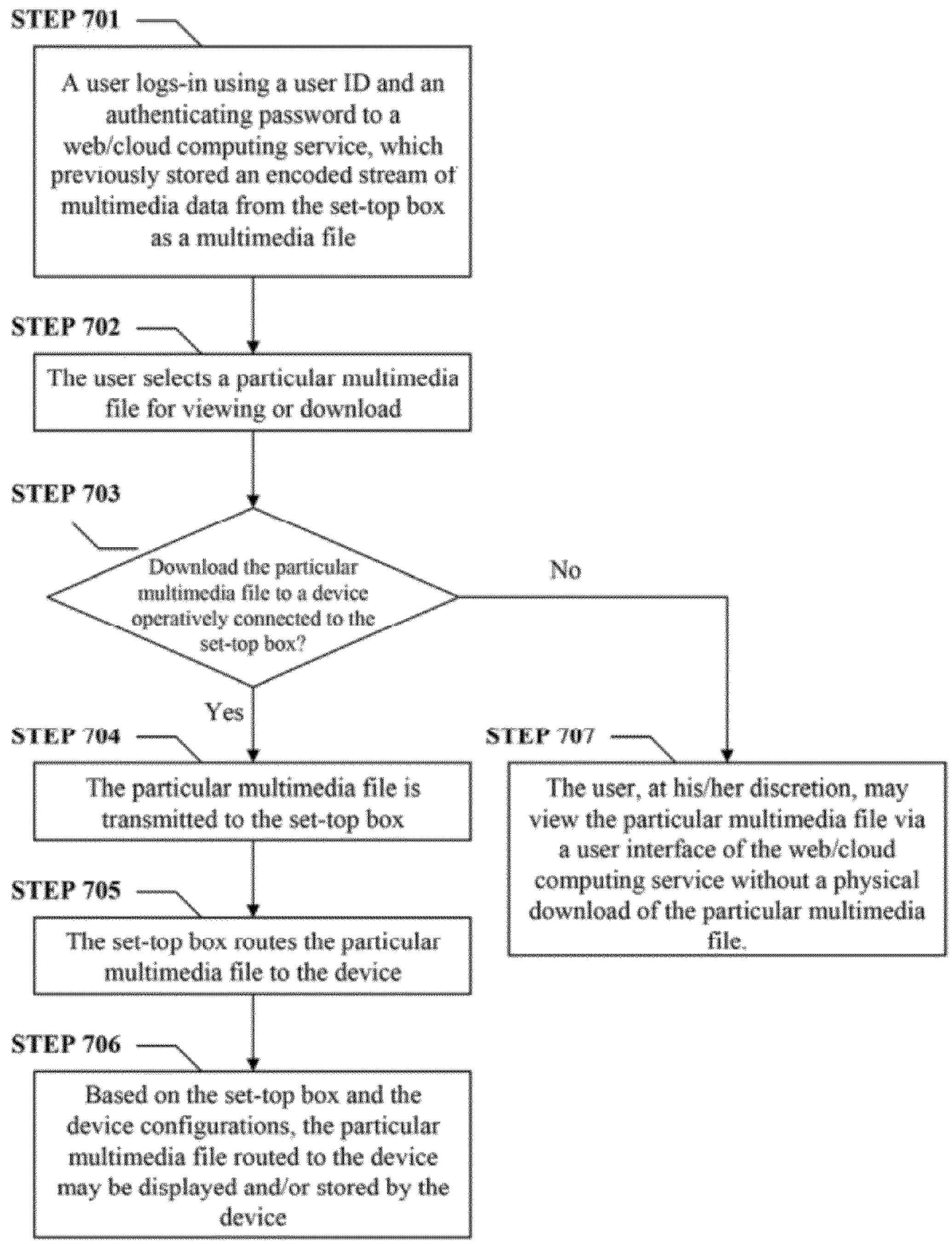
FIG. 7 shows a flowchart showing how multimedia data initially auto-routed and stored in the web and/or cloud computing storage via the set-top box can be accessed by a user, in accordance with an embodiment of the invention.

FIG. 7 shows a flowchart showing how multimedia data initially auto-routed and stored in the web and/or cloud computing storage via the set-top box can be accessed by a user, in accordance with an embodiment of the invention. In STEP 701, a user can log-in using a user ID and an authenticating password to a web/cloud computing service, which previously stored an encoded stream of multimedia data from the set-top box as a multimedia file. Once logged in, the user can select a particular multimedia file for viewing or downloading, as shown in STEP 702. Then, if the user wants to download the particular multimedia file to a destination device operatively connected to the set-top box, as shown in STEP 703, the particular multimedia file can be transmitted to the set-top box, as shown in STEP 704. Then, the set-top box can route the particular multimedia file to the destination device operatively connected to the set-top box, as shown in STEP 705. Furthermore, based on the set-top box and the device configurations, the particular multimedia file routed to the destination device may be displayed and/or stored by the destination device, as shown in STEP 706. Examples of the destination device include a cellular phone, a media recorder and/or player, a USB Flash memory card, and a video game player. The interaction among the web/cloud computing service, the set-top box, and the destination device is largely if not entirely automated, thereby requiring little to no manual human intervention.

If the user did not want to download the particular multimedia file to a destination device operatively connected to the set-top box in STEP 703, then the user, at his/her discretion, may view the particular multimedia file via a user interface of the web/cloud computing service without a physical download of the particular multimedia file, as shown in STEP 707.

Figure 8:
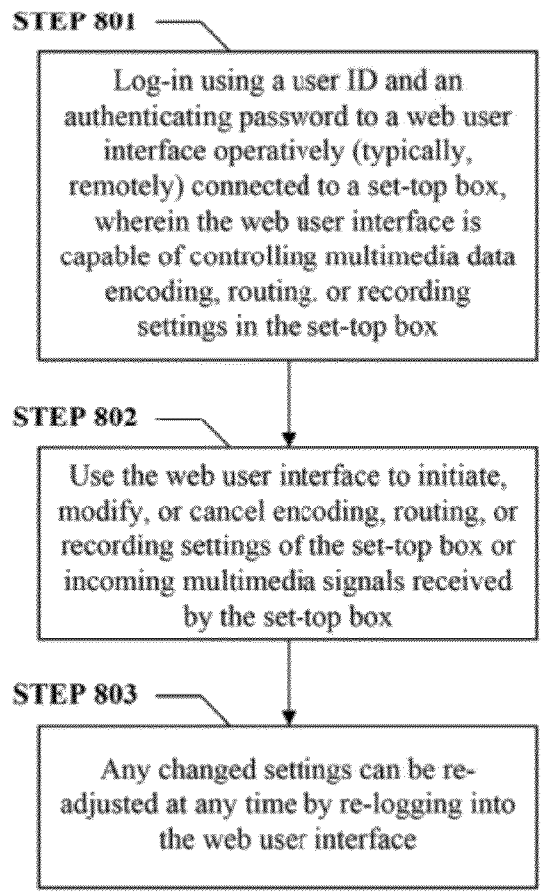
FIG. 8 shows a flowchart showing how a user can control the set-top box via a web and/or cloud computing service which enables initiating, modifying, or cancel encoding, routing, and/or storing of incoming multimedia signals to the set-top box, in accordance with an embodiment of the invention.

FIG. 8 shows a flowchart showing how a user can control the set-top box via a web and/or cloud computing service which enables initiating, modifying, or cancel encoding, routing, and/or storing of incoming multimedia signals to the set-top box, in accordance with an embodiment of the invention. In STEP 801, a user can log-in using a user ID and an authenticating password to a web user interface operatively and typically remotely connected to a set-top box. In one embodiment of the invention, the web user interface is capable of controlling multimedia data encoding, routing, or recording settings in the set-top box. The web user interface is also typically capable of changing TV channels and scheduled time recordings if an encoded stream of multimedia data is configured to be stored on a device, platform, or service operatively connected to the set-top box. Then, in STEP 802, the user can utilize the web user interface to initiate, modify, or cancel encoding, routing, or recording settings of the set-top box or incoming multimedia signals received by the set-top box. Furthermore, as shown in STEP 803, any changed settings can be re-adjusted at any time by re-logging into the web user interface.

Figure 9:
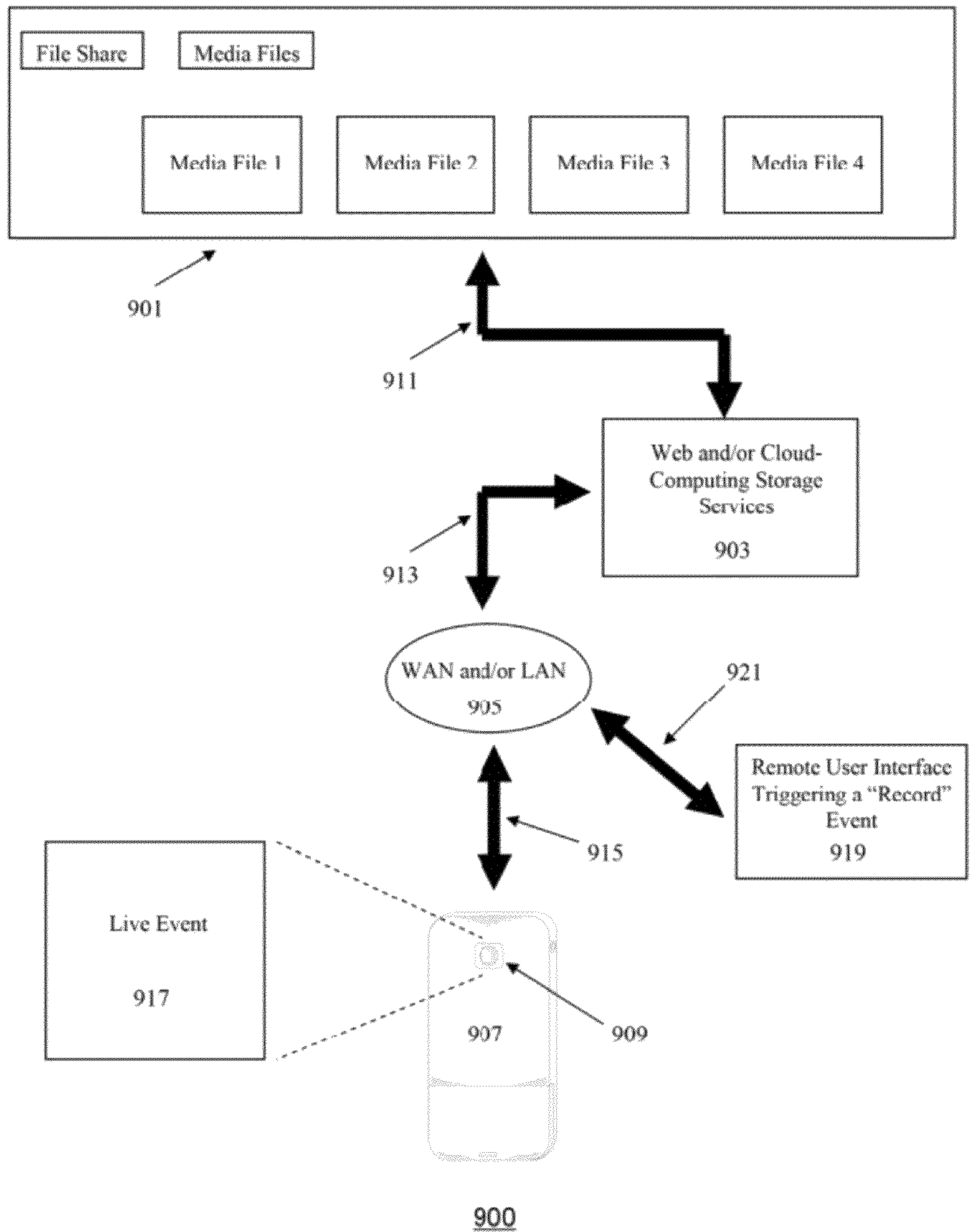
FIG. 9 shows an apparatus performing an automatic real-time cloud computing processing of live multimedia content from a portable electronic device, in accordance with an embodiment of the invention.

FIG. 9 shows an apparatus (900) performing an automatic real-time cloud computing processing of live multimedia content from a portable electronic device (e.g. 907), in accordance with an embodiment of the invention. In a preferred embodiment of the invention, a remote user interface (919), such as a web interface on a computer, is operatively connected (i.e. 921, 915) to the portable electronic device (e.g. 907) via a data network (e.g. WAN and/or LAN (905)). In the preferred embodiment of the invention, this remote user interface (919) remotely triggers the recording of a live event (917) from the portable electronic device (e.g. 907), after which the portable electronic device starts recording the live event (917) based on the event trigger from the remote user interface (919).

As shown in FIG. 9, in the preferred embodiment of the invention, the portable electronic device is a cellular phone (907) with a camera lens (909) and/or a microphone. The camera lens (909) may capture visual aspects of a live event (917), while the microphone, if used, may capture aural aspects of the live event (917). In the preferred embodiment of the invention, the cellular phone (907) (i.e. a type of a portable electronic device) can encode raw sensory data from the camera lens (909) and/or the microphone into one or more standardized multimedia encoding formats (e.g. MPEG1, MPEG2, MPEG4, WMV, and etc.) and place a stream of encoded visual and/or aural data into a buffer, or another temporary data storage inside the cellular phone. In another embodiment of the invention, the cellular phone (907) does not use a sizable buffer or any buffer, and sends data packets out as quickly as possible to a web and/or cloud computing services (903) via a data network (905) in real time, as a portion of the stream of the encoded visual and/or aural data becomes available for transmission.

Furthermore, in one embodiment of the invention, the cellular phone (907) is also configured to infuse or superimpose location information or any other helpful information into the stream of encoded visual and/or aural data. In one example, location information comprising Global Positioning System (GPS) signals and map information are infused into the stream of encoded visual and/or aural data, so that the location information can be juxtaposed next to the visual and/or aural data when a user is viewing the visual and/or aural data upon decoding. In another example, another helpful piece of information may be infused into the stream of encoded visual and/or aural data so that this helpful piece of information can be available at the time of decoding and playback.

In the preferred embodiment of the invention, instead of permanently storing the stream of encoded visual and/or aural data from the live event (917) in the cellular phone (909), the cellular phone (907) uses its wireless transmitter to send (i.e. 915, 913) the stream of encoded visual and/or aural data directly to a web and/or cloud computing service entity (903) via a cellular network, a local area network (LAN), the Internet, and/or another data network (905). In one embodiment of the invention, the web and/or cloud computing service entity (903) operates a computerized database executed on a CPU and a memory unit of a computer server, wherein the computerized database is configured to store and retrieve multimedia data such as the transmitted (i.e. 915, 913) visual and/or aural data from the cellular phone (907).

Furthermore, in one embodiment of the invention, the web and/or cloud computing service entity (903) also operates (i.e. 911) a multimedia data management and viewing program (901) executed on the CPU and the memory unit of the computer server, as shown in FIG. 9. The multimedia data management and viewing program (901) is configured to divide or "segmentize" incoming multimedia data into multiple files (e.g. Media File 1~Media File 4) during the real-time transmission of the visual and/or aural data from the cellular phone (907), so that each segmentized multimedia data can be viewed in small chunks by a user accessing the web and/or cloud computing service entity (903), even before the entire stream of the visual and/or aural data from the cellular phone (907) capturing the live event (917) is completely transmitted to the web and/or cloud computing service entity (903).

In one embodiment of the invention, this novel segmentization of real-time multimedia data in the web and/or cloud computing service entity (903) is especially helpful when the data transmission speed from the cellular phone to the web and/or cloud computing service entity (903) via the data network (905) is unreliable or inconsistent. Instead of waiting for the entire stream of the visual and/or aural data from the cellular phone (907) to be received and then subsequently further processed by the web and/or cloud computing service entity (903), the web and/or cloud computing service entity (903) operating the multimedia data management and viewing program (901) can segmentize real-time multimedia data into multiple files (Media File 1~Media File 4) of varying sizes, depending on the current speed of data transmission. This dynamic segmentization enables faster near real-time viewing of incoming multimedia information.

For example, the size of each segmentized media file may be determined by a defined periodic time trigger (e.g. every 2 minutes, 4 minutes, and etc. during the multimedia data transmission). In this example, for every defined periodic time trigger (e.g. every 2 minutes, 4 minutes, and etc. during the multimedia data transmission), a new segmentized media file can be created and processed by the web and/or cloud computing service entity (903) for preview by a user logged onto the web and/or cloud computing service entity (903), even as the transmission of multimedia data from the cellular phone (907) is not yet complete.

In this particular example, if the current speed of data transmission from the cellular phone (907) is slow, a newly-created segmentized media file may be smaller than another segmentized media file, which was created when the data transmission speed from the cellular phone (907) was faster. In one embodiment of the invention, the dynamic sizing of segmentized media files depending on the speed of data transmission enables a faster "preview" access to a user logged into the web and/or cloud computing service entity (903), even as the multimedia data is still getting transmitted (i.e. 915, 913, 911) from the cellular phone (907) to the web and/or cloud computing service entity (903), because the user does not have to wait until the entire multimedia data are received and processed as one chunk of multimedia file.

In one embodiment of the invention, once the transmission of the entire multimedia data is complete, the web and/or cloud computing service entity (903) operating the multimedia data management and viewing program (901) can "stitch" a plurality of segmentized media files together as a single file, which may be identifiable by a user ID or the cellular phone (907) used to perform real-time transmission of the live event multimedia data. In this embodiment of the invention as shown in FIG. 9, the cellular phone (907) does not store the live event multimedia data in its permanent storage, so a cell phone user's retrieval of the saved multimedia data may require accessing the web and/or cloud computing service entity (903) from the cellular phone (907) instead of accessing a local storage of the cellular phone (907).

In one embodiment of the invention, when the cellular phone (907) provides streaming live event-related multimedia data in real time to the web and/or cloud computing service entity (903) without first saving a local copy of the multimedia data in an internal storage unit of the cellular phone (907), the authenticity and the data integrity of the live event-related multimedia data may be more trusted by interested parties, (e.g. a law enforcement entity, a news media organization requiring a certified level of authentic multimedia footages, an intelligence organization, a demanding viewer, and etc.) because an immediate real-time wireless and/or wired transmission of encoded multimedia data from a live event (e.g. 917) is substantially more temper-proof than locally-stored multimedia data in the cellular phone (907), which may be subject to subsequent data tempering.

In another embodiment of the invention, the cellular phone (907) may store a local copy of the multimedia data in its internal storage unit as a media file, while also transmitting the live event-related multimedia data in real time to the web and/or cloud computing service entity (903). In this embodiment of the invention, the authenticity and the data integrity of the live event-related multimedia data are still not compromised because the web and/or cloud computing service entity (903) keeps a real-time uploaded stream copy of the live event-related multimedia data, while a cell phone user can still have a fast access to a local copy of the live event-relate multimedia data stored in the cell phone's (907) internal storage.

Figure 10:
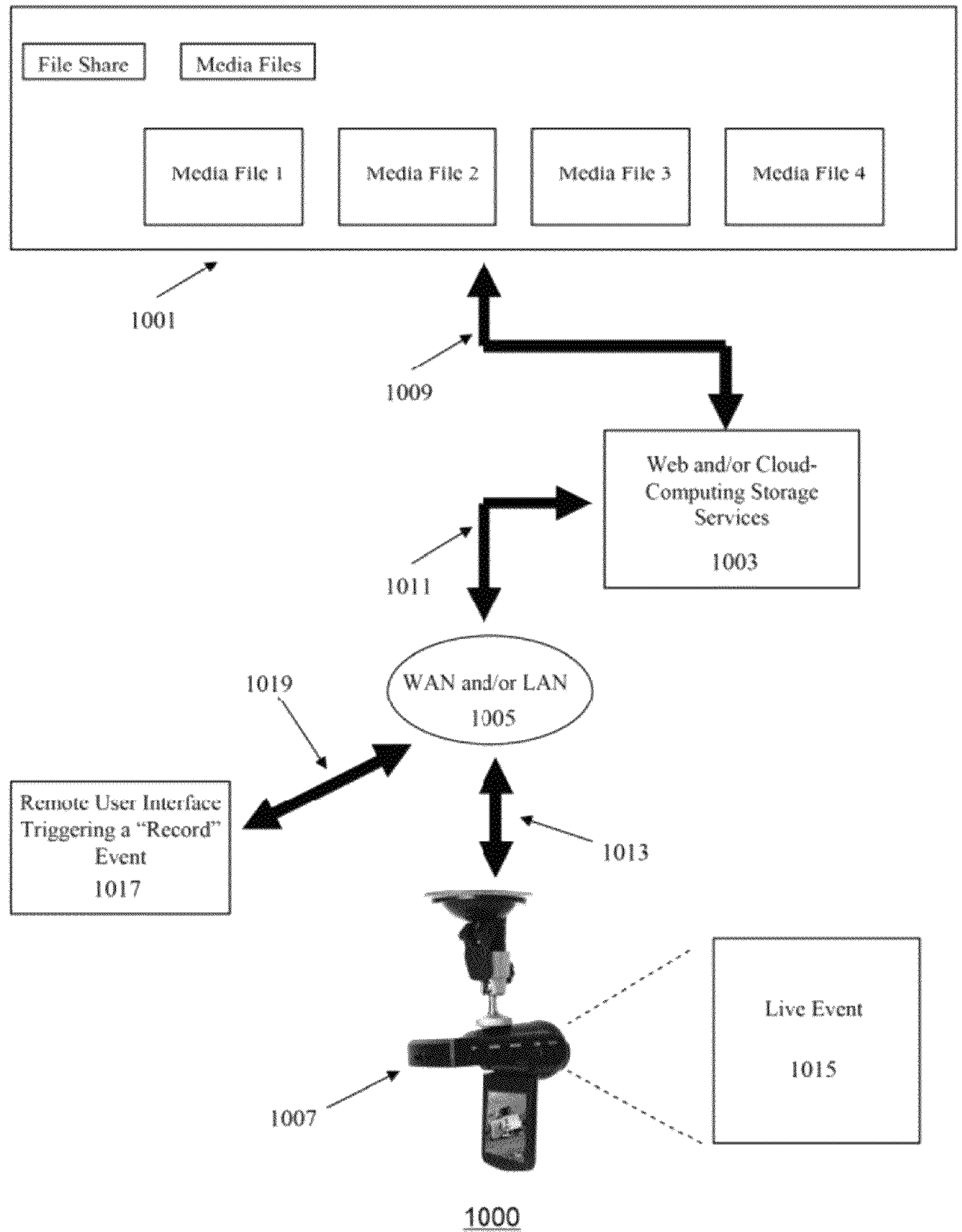
FIG. 10 shows another apparatus performing an automatic real-time cloud computing processing of live multimedia content from another portable electronic device, in accordance with an embodiment of the invention.

FIG. 10 shows another apparatus (1000) performing an automatic real-time cloud computing processing of live multimedia content from another portable electronic device, in accordance with an embodiment of the invention. In one embodiment of the invention, the portable electronic device is a vehicle black box system (1007) with a camera lens and/or a microphone. Furthermore, in one embodiment of the invention, a remote user interface (1017), such as a web interface on a computer, can be operatively connected (i.e. 1019, 1013) to the vehicle black box system (1007) via a data network (e.g. WAN and/or LAN (1005)). This remote user interface (1017) may trigger the recording of a live event (1015) from the vehicle black box system (1007), after which the vehicle black box system (1007) starts recording the live event (1015) based on the event trigger from the remote user interface (1017).

In general, a vehicle black box system is capable of capturing visual and aural information near a car windshield to encode the visual and the aural information into a standard multimedia format for wireless transmission and/or for a local storage. In one embodiment of the invention, the camera lens on the vehicle black box system (1007) may capture visual aspects of a live event (1015), while the microphone, if used, may capture aural aspects of the live event (1015). The vehicle black box system (1007) as shown in FIG. 10 can encode raw sensory data from the camera lens and/or the microphone into one or more standardized multimedia encoding formats (e.g. MPEG1, MPEG2, MPEG4, WMV, and etc.) and place a stream of encoded visual and/or aural data into a buffer, or another temporary data storage inside the vehicle black box system (1007). In another embodiment of the invention, the vehicle black box system (1007) does not use a sizable buffer or any buffer, and sends data packets out as quickly as possible to a web and/or cloud computing services (1003) via a data network (1005) in real time, as a portion of the stream of the encoded visual and/or aural data becomes available for transmission.

Furthermore, in one embodiment of the invention, the vehicle black box system (1007) is also configured to infuse or superimpose location information or any other helpful information into the stream of encoded visual and/or aural data. In one example, location information comprising Global Positioning System (GPS) signals and map information are infused into the stream of encoded visual and/or aural data, so that the location information can be juxtaposed next to the visual and/or aural data when a user is viewing the visual and/or aural data upon decoding. In another example, another helpful piece of information may be infused into the stream of encoded visual and/or aural data so that this helpful piece of information can be available at the time of decoding and playback.

In one embodiment of the invention, instead of permanently storing the stream of encoded visual and/or aural data from the live event (1015) in the vehicle black box system (1007), the vehicle black box system (1007) uses its wireless transmitter to send (i.e. 1013, 1011) the stream of encoded visual and/or aural data directly to a web and/or cloud computing service entity (1003) via a cellular network, a local area network (LAN), the Internet, and/or another data network (1005). In one embodiment of the invention, the web and/or cloud computing service entity (1003) operates a computerized database executed on a CPU and a memory unit of a computer server, wherein the computerized database is configured to store and retrieve multimedia data such as the transmitted (i.e. 1013, 1011) visual and/or aural data from the vehicle black box system (1007).

Furthermore, in one embodiment of the invention, the web and/or cloud computing service entity (1003) also operates (i.e. 1009) a multimedia data management and viewing program (1001) executed on the CPU and the memory unit of the computer server, as shown in FIG. 10. The multimedia data management and viewing program (1001) is configured to divide or "segmentize" incoming multimedia data into multiple files (e.g. Media File 1~Media File 4) during the real-time transmission of the visual and/or aural data from the vehicle black box system (1007), so that each segmentized multimedia data can be viewed in small chunks by a user accessing the web and/or cloud computing service entity (1003), even before the entire stream of the visual and/or aural data from the vehicle black box system (1007) capturing the live event (1015) is completely transmitted to the web and/or cloud computing service entity (1003).

In one embodiment of the invention, this novel segmentization of real-time multimedia data in the web and/or cloud computing service entity (1003) is especially helpful when the data transmission speed from the vehicle black box system to the web and/or cloud computing service entity (1003) via the data network (1005) is unreliable or inconsistent. Instead of waiting for the entire stream of the visual and/or aural data from the vehicle black box system (1007) to be received and then subsequently further processed by the web and/or cloud computing service entity (1003), the web and/or cloud computing service entity (1003) can utilize the multimedia data management and viewing program (1001) to segmentize real-time multimedia data into multiple files (e.g. Media File 1~Media File 4) of varying sizes, depending on the current speed of data transmission. This dynamic segmentization enables faster near real-time viewing of incoming multimedia information.

For example, the size of each segmentized media file may be determined by a defined periodic time trigger (e.g. every 2 minutes, 4 minutes, and etc. during the multimedia data transmission). In this example, for every defined periodic time trigger (e.g. every 2 minutes, 4 minutes, and etc. during the multimedia data transmission), a new segmentized media file can be created and processed by the web and/or cloud computing service entity (1003) for preview by a user logged onto the web and/or cloud computing service entity (1003), even as the transmission of multimedia data from the vehicle black box system (1007) is not yet complete.

In this particular example, if the current speed of data transmission from the vehicle black box system (1007) is slow, a newly-created segmentized media file may be smaller than another segmentized media file, which was created when the data transmission speed from the vehicle black box system (1007) was faster. In one embodiment of the invention, the dynamic sizing of segmentized media files depending on the speed of data transmission enables a faster "preview" access to a user logged into the web and/or cloud computing service entity (1003), even as the multimedia data is still getting transmitted (i.e. 1013, 1011, 1009) from the vehicle black box system (1007) to the web and/or cloud computing service entity (1003), because the user does not have to wait until the entire multimedia data are received and processed as one chunk of multimedia file.

In one embodiment of the invention, once the transmission of the entire multimedia data is complete, the web and/or cloud computing service entity (1003) operating the multimedia data management and viewing program (1001) can "stitch" a plurality of segmentized media files together as a single file, which may be identifiable by a user ID or the vehicle black box system (1007) used to perform real-time transmission of the live event multimedia data. In this embodiment of the invention as shown in FIG. 10, the vehicle black box system (1007) does not store the live event multimedia data in its permanent storage, so a vehicle black box system user's retrieval of the saved multimedia data may require accessing the web and/or cloud computing service entity (1003) from the vehicle black box system (1007) instead of accessing a local storage of the vehicle black box system (1007).

In one embodiment of the invention, when the vehicle black box system (1007) provides streaming live event-related multimedia data in real time to the web and/or cloud computing service entity (1003) without first saving a local copy of the multimedia data in an internal storage unit of the vehicle black box system (1007), the authenticity and the data integrity of the live event-related multimedia data may be more trusted by interested parties, (e.g. a law enforcement entity, a news media organization requiring a certified level of authentic multimedia footages, an intelligence organization, a demanding viewer, and etc.) because an immediate real-time wireless and/or wired transmission of encoded multimedia data from a live event (e.g. 1015) is substantially more temper-proof than locally-stored multimedia data in the vehicle black box system (1007), which may be subject to subsequent data tempering.

In another embodiment of the invention, the vehicle black box system (1007) may store a local copy of the multimedia data in its internal storage unit as a media file, while also transmitting the live event-related multimedia data in real time to the web and/or cloud computing service entity (1003). In this embodiment of the invention, the authenticity and the data integrity of the live event-related multimedia data are still not compromised because the web and/or cloud computing service entity (1003) keeps a real-time uploaded stream copy of the live event-related multimedia data, while a vehicle black box system user can still have a fast access to a local copy of the live event-relate multimedia data stored in the vehicle black box system's (1007) internal storage.

Figure 11:
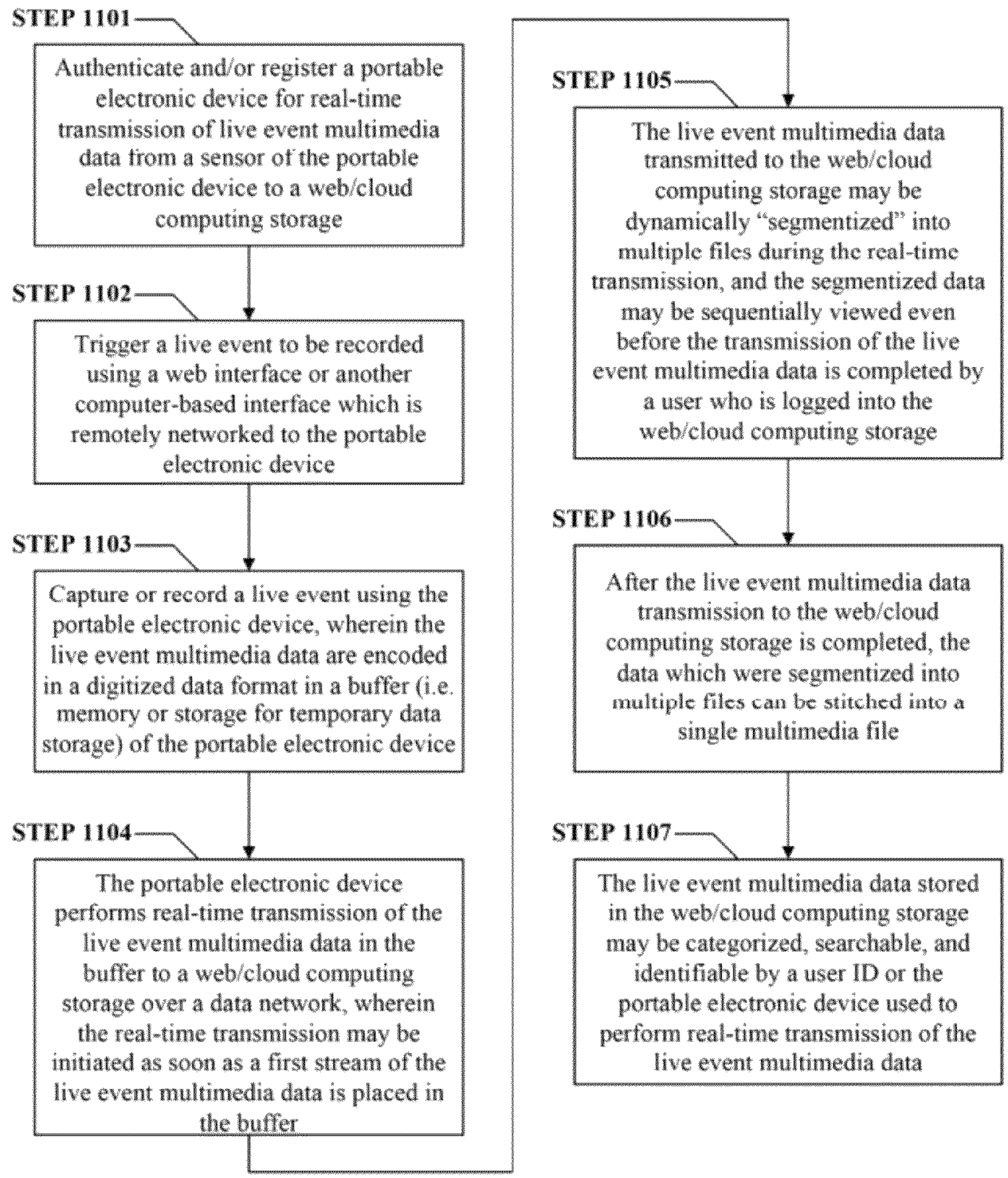
FIG. 11 shows a method for automatic real-time cloud computing processing of live multimedia content, in accordance with an embodiment of the invention.

FIG. 11 shows a method for automatic real-time cloud computing processing of live multimedia content, in accordance with an embodiment of the invention. In a preferred embodiment of the invention, a portable electronic device user first authenticates and/or registers a portable electronic device such as a cellular phone or a vehicle black box system for real-time transmission of live event multimedia data from a sensor of the portable electronic device to a web/cloud computing storage, as shown in STEP 1101. In the preferred embodiment of the invention, a user can trigger a live event to be recorded using a web interface or another computer-based interface, which is remotely networked to the portable electronic device, as shown in STEP 1102. Then, the portable electronic device captures and/or records a live event using a portable electronic device, wherein the live event multimedia data are encoded in a digitized data format in a buffer of the portable electronic device, as shown in STEP 1103. In general, a buffer is a memory unit or another data storage unit only for temporary data storage, and contents in the buffer are not destined to be maintained permanently after a particular task is completed by a CPU in the portable electronic device.

Then, as shown in STEP 1104, the portable electronic device performs real-time transmission of the live event multimedia data in the buffer to the web/cloud computing storage over a data network, wherein the real-time transmission may be initiated as soon as a first stream of the live event multimedia data is placed in the buffer. In a preferred embodiment of the invention, the data network comprises a cellular communication network, the Internet, and a local area network (LAN), part of which may be wireless, wired, or both. In another embodiment of the invention, the data network comprises one or more combinations of wired and wireless networks, which operatively connect the portable electronic device to the web/cloud computing storage.

Once one or more streams of the live event multimedia data are transmitted to the web/cloud computing storage in real time, a multimedia data management and viewing program (e.g. 901 of FIG. 9, 1001 of FIG. 10) operatively connected to the web/cloud computing storage can divide or "segmentize" incoming streams of the live event multimedia data into multiple media files, as shown in STEP 1105. The real-time segmentization of received multimedia data into multiple media files enables sequential and faster previewing of the incoming multimedia data by a user logged into a web/cloud computing storage service who otherwise may have to wait until the entire multimedia data is transmitted to and processed by the web/cloud computing storage. Therefore, the segmentized data may be sequentially viewed even before the transmission of the live event multimedia data is completed by a user who is logged into the web/cloud computing storage service using this embodiment of the invention.

Continuing with STEP 1105 in FIG. 11, in one embodiment of the invention, the size of each divided media file during the real-time transmission of the live event multimedia can vary (i.e. dynamic file size determination for each segment of the incoming multimedia file), depending on a current speed of data transmission in the data network. In some embodiments of the invention, the dynamic file size determination for each segment of the incoming multimedia file may enable faster near real-time viewing of incoming multimedia information.

For example, the size of each segmentized media file may be determined by a defined periodic time trigger (e.g. every 2 minutes, 4 minutes, and etc. during the multimedia data transmission). In this example, for every defined periodic time trigger (e.g. every 2 minutes, 4 minutes, and etc. during the multimedia data transmission), a new segmentized media file can be created and processed by the multimedia data management and viewing program for preview by a user logged onto the web and/or cloud computing storage service, even as the transmission of multimedia data from the portable electronic device is not yet complete.

In this particular example, if the current speed of data transmission from the portable electronic device is slow, a newly-created segmentized media file may be smaller than another segmentized media file, which was created when the data transmission speed from the portable electronic device was faster. In one embodiment of the invention, the dynamic sizing of segmentized media files depending on the speed of data transmission enables a faster "preview" access to a user logged into the web and/or cloud computing storage service, even as the multimedia data is still getting transmitted from the portable electronic device to the web and/or cloud computing storage, because the user does not have to wait until the entire multimedia data are received and processed as one chunk of multimedia file.

Continuing with FIG. 11, in one embodiment of the invention, after the live event multimedia data transmission is complete to the web/cloud computing storage from the portable electronic device, the data which were segmentized into multiple files can be stitched into a single multimedia file, as shown in STEP 1106. Then, the live event multimedia data stored in the web/cloud computing storage may be categorized, searchable, and identifiable by a user ID or the portable electronics device used to perform real-time transmission of the live event multimedia data, as shown in STEP 1107.

Figure 12:
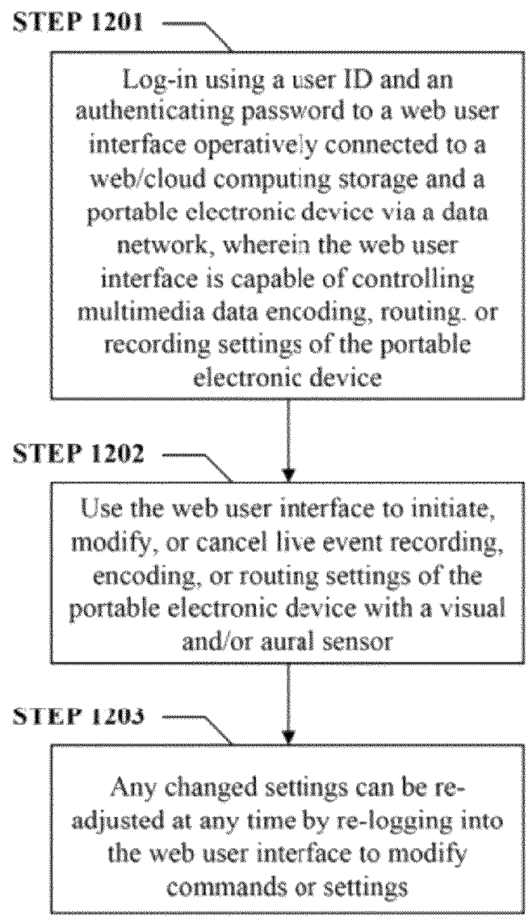
FIG. 12 shows how a user can control a portable electronic device via a web/cloud computing service to initiate, modify, or cancel recording, encoding, routing, and/or storing of live events captured by visual and/or aural sensors of the portable electronic device, in accordance with an embodiment of the invention.

FIG. 12 shows how a user can control a portable electronic device via a web/cloud computing service to initiate, modify, or cancel recording, encoding, routing, and/or storing of live events captured by visual and/or aural sensors of the portable electronic device, in accordance with an embodiment of the invention. In one embodiment of the invention, a user can log-in using a user ID and an authenticating password to a web user interface, which is operatively connected to a web and/or cloud computing storage service and a portable electronic device using a data network. If the user has privileges to modify settings in the portable electronic device, which may be verified via an authorization process with the web and/or cloud computing storage service and the portable electronic device, the web user interface is capable of controlling multimedia data encoding, routing, or recording settings of the portable electronic device, as shown in STEP 1201. Then, the user can utilize the web user interface to initiate, modify, and/or cancel live event recording, encoding, and/or routing settings of the portable electronic device with a visual and/or aural sensor, as shown in STEP 1202. In one embodiment of the invention, any changed settings can be re-adjusted at any time by re-logging into the web user interface to modify commands or settings, as shown in STEP 1203.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for performing an automatic real-time cloud computing processing of live multimedia content, the apparatus comprising:

a portable electronic device capturing a live event when a record instruction is remotely triggered by a user operating a web interface remotely networked to the portable electronic device, wherein the live event is then encoded as visual and aural information in a standard multimedia format using a microprocessor and an embedded codec in the portable electronic device that specifically prevents saving a local copy of the visual and aural information to create a certified level of temper-proof authenticity of the visual and aural information for law enforcement and intelligence application, and wherein the encoded visual and aural information is instead immediately transmitted to a cloud computing service unit in real time via a data network;

the cloud computing service unit executing a multimedia data management and viewing program operating on a CPU and a memory unit in the cloud computing service unit, wherein the cloud computing service unit is configured to receive an incoming stream of the encoded visual and aural information from the portable electronic device via a data network, and wherein the multimedia data management and viewing program divides the incoming stream of the encoded visual and aural information into individually-viewable segments of variable lengths prior to data transmission to another device, and wherein each length of each individually-viewable segment is shorter when the cloud computing service unit's workload is heavy and when bandwidth availability of the cloud computing service is low, and wherein each length of each individually-viewable segment is longer when the cloud computing service unit's workload is light and when the cloud computing service unit's bandwidth availability is high;

the web user interface executed on the CPU and the memory unit of the cloud computing service unit or on an associated computer system operatively connected to the cloud computing service unit, wherein the web user interface is configured to log in a user to access one of the individually-viewable segments from the multimedia data management and viewing program in the cloud computing service unit, even while data transmission for the incoming stream of the encoded visual and aural information from the portable electronic device to the cloud computing service unit is still in progress and not fully completed;

the multimedia data management and viewing program operating on a CPU and a memory unit in the cloud computing service unit, wherein at least some of the individually-viewable segments of variable lengths are automatically stitched together as a single viewable multimedia file by the multimedia data management and viewing program, once all of the incoming stream of the encoded visual and aural information from the portable electronic device for the live event is entirely fully transmitted to the cloud computing service unit; and the data network comprising a wireless data network and/or a wired data network which are operatively connected to the portable electronic device and the cloud computing service unit, wherein the data network is configured to transmit the encoded visual and aural information from the portable electronic device to the cloud computing service unit.

2. The apparatus of claim 1, wherein the encoded visual and aural information is temporarily placed in a buffer memory unit of the portable electronic device prior to transmission to the cloud computing service unit.

3. The apparatus of claim 2, wherein the buffer memory unit of the portable electronic device stores a particular portion of the encoded visual and aural information temporarily until the particular portion of the encoded visual and aural information is completely transmitted to the cloud computing service unit via the data network.

4. The apparatus of claim 1, wherein the cloud computing service unit further comprises a computer server, a network interface unit configured to send and receive data packets via the data network, and a hard disk drive.

5. The apparatus of claim 1, wherein the portable electronic device is a cellular phone with a camera lens and a microphone to capture visual and aural information from the live event, wherein the captured visual and aural information is further processed to become the encoded visual and aural information using the microprocessor and the embedded codec of the portable electronic device.

6. The apparatus of claim 1, wherein the portable electronic device is a vehicle black box system with a camera lens and a microphone to capture visual and aural information from the live event, wherein the captured visual and aural information is further processed to become the encoded visual and aural information using the microprocessor and the embedded codec of the portable electronic device.

7. A method for automatic real-time cloud computing processing of a live multimedia content, the method comprising:

registering and authenticating a portable electronic device for real-time transmission of live event multimedia data from a sensor of the portable electronic device to a cloud computing service unit;

triggering a live event to be recorded using a web interface operating on a computer or another computer-based interface which is remotely networked to the portable electronic device;

capturing the live event using the portable electronic device, wherein the live event multimedia data are encoded in a digitized data format in a buffer memory unit of the portable electronic device, wherein the portable electronic device specifically prevents saving a local copy of the visual and aural information to create a certified level of temper-proof authenticity of encoded visual and aural information for law enforcement and intelligence application;

performing a real-time transmission of the live event multimedia data in the buffer memory unit to the cloud computing service unit over a data network, wherein the real-time transmission is initiated as soon as a first stream of the live event multimedia data is placed in the buffer memory unit;

dynamically segmentizing the live event multimedia data into individually-viewable segments of variable lengths in the cloud computing service unit prior to data transmission to another device from the cloud computing service unit, wherein each length of each individually-viewable segment is shorter when the cloud computing service unit's workload is heavy and when the cloud computing service unit's bandwidth availability is low, and wherein each length of each individually-viewable segment is longer when the cloud computing service unit's workload is light and when the cloud computing service unit's bandwidth availability is high, and wherein each individually-viewable segment is viewable by a user logged into the cloud computing service unit even before the real-time transmission of the live event multimedia data is entirely completed from the portable electronic device; and stitching at least some of the individually-viewable segments of variable lengths as a single viewable multimedia file using a multimedia data management and viewing program executed in the cloud computing service unit, once the real-time transmission of the live event multimedia data is entirely completed from the portable electronic device to the cloud computing service unit.

8. The method of claim 7, wherein the step of performing the real-time transmission of the live event multimedia data in the buffer memory unit of the portable electronic device to the cloud computing service unit over the data network involves a wireless network, a wired network, or both.

9. The method of claim 7, further comprising a step of storing the single viewable multimedia file in the cloud computing service unit, wherein the single viewable multimedia file is categorized, searchable, and identifiable by a user ID of the portable electronic device.

* * * * *